US007648937B2

(12) United States Patent
Yoon et al.

(10) Patent No.: US 7,648,937 B2
(45) Date of Patent: Jan. 19, 2010

(54) CATALYST SYSTEM FOR POLYMERIZING CYCLIC OLEFIN HAVING POLAR FUNCTIONAL GROUP, POLYMERIZING METHOD USING THE CATALYST SYSTEM, OLEFIN POLYMER PRODUCED BY THE METHOD AND OPTICAL ANISOTROPIC FILM COMPRISING THE OLEFIN POLYMER

(75) Inventors: Sung Cheol Yoon, Daejeon (KR); Young Chul Won, Daejeon (KR); Young Whan Park, Daejeon (KR); Sung Ho Chun, Daejeon (KR); Dai Seung Choi, Daejeon (KR); Won Kook Kim, Daejeon (KR); Taesun Lim, Seoul (KR); Heon Kim, Daejeon (KR); Jungmin Lee, Daejeon (KR); Kyung Lim Paik, Daejeon (KR)

(73) Assignee: LG Chem, Ltd., Seoul (KR)

( * ) Notice: Subject to any disclaimer, the term of this patent is extended or adjusted under 35 U.S.C. 154(b) by 490 days.

(21) Appl. No.: 11/227,093

(22) Filed: Sep. 16, 2005

(65) Prior Publication Data
US 2006/0058477 A1    Mar. 16, 2006

(30) Foreign Application Priority Data
Sep. 16, 2004  (KR) .................. 10-2004-0074307
Jul. 7, 2005    (KR) .................. 10-2005-0061152

(51) Int. Cl.
*B01J 31/00*    (2006.01)
*C08F 4/06*     (2006.01)

(52) U.S. Cl. ................ 502/167; 526/282; 526/172; 502/103; 502/118

(58) Field of Classification Search ........... 502/103, 502/118, 167; 526/282, 172
See application file for complete search history.

(56) References Cited

U.S. PATENT DOCUMENTS

| 3,536,681 | A | 10/1970 | Morris |
| 3,679,490 | A | 7/1972 | Finkbiner |
| 5,468,819 | A | 11/1995 | Goodall et al. |
| 5,569,730 | A | 10/1996 | Goodall et al. |
| 5,912,296 | A | 6/1999 | Wang et al. |
| 5,912,313 | A | 6/1999 | McIntosh, III et al. |
| 6,031,058 | A | 2/2000 | McIntosh, III et al. |
| 6,111,041 | A | 8/2000 | Sen et al. |
| 6,303,724 | B1 | 10/2001 | Goodall et al. |
| 6,455,650 | B1 | 9/2002 | Lipian et al. |
| 6,492,443 | B1 | 12/2002 | Kodemura et al. |
| 6,593,440 | B2 | 7/2003 | Sen et al. |
| 7,371,803 | B2 * | 5/2008 | Solan et al. .............. 526/172 |
| 2002/0052454 | A1 | 5/2002 | Lipian et al. |
| 2005/0038186 | A1 | 2/2005 | Morikawa et al. |
| 2005/0171310 | A1 | 8/2005 | Oshima et al. |

FOREIGN PATENT DOCUMENTS

| EP | 0 426 637 A2 | 5/1991 |
| JP | 2002-155109 | 5/2002 |
| JP | 2004-231775 | 8/2004 |
| JP | 2005-060639 | 3/2005 |
| KR | 10-2000-0052871 A | 8/2000 |
| KR | 10-2002-0020255 A | 3/2002 |
| KR | 10-2003-0072085 A | 9/2003 |
| KR | 10-2004-0005594 A | 1/2004 |
| KR | 10-2004-0045108 A | 6/2004 |
| KR | 10-2004-0049946 A | 6/2004 |
| KR | 10-2005-0053096 | 6/2005 |
| KR | 10-2005-0061152 | 6/2005 |
| KR | 10-2005-0109173 | 11/2005 |
| WO | WO 2004/005360 A2 | 1/2004 |
| WO | WO 2004/050726 A1 | 6/2004 |
| WO | WO 2005/019277 A1 | 3/2005 |

OTHER PUBLICATIONS

Macromol. Symp. 97, 225-246 (1995) by M. Arndt and W. Kaminsky, "Microstructure of Poly(cycloolefins) Produced by Metallocene/Methylaluminoxane (mao) Catalysts".
Chem. Rev. 2000, vol. 100, 1169-1203 by S. Ittel and L. Johnson, "Late-Metal Catalysts for Ethylene Homo- and Copolymerization".
Chem Rev. 2000, vol. 100, 1253-1345 by L. Resconi, L. Cavallo, A. Fait and F. Piemontesi, "Selectivity in Propene Polymerization with Metallocene Catalysts".
Chem. Rev. 1988, vol. 88, 1405-1421 by W. Beck and K. Sunkel, "Metal Complexes of Weakly Coordinating Anions. Precoursors of Strong Cationic Organometallic Lewis Acids".
Chem. Rev. 1993, vol. 93, 927-942 by S. Strauss, "The Search for Larger and More Weakly Coordinating Anions".
Angew, Chem. Int. Ed., 1985, vol. 24, 507 by W. Kaminsky, K. Kulper, H. Brintzinger and F. Wild, "Polymerization of Propene and Butene with a Chiral Zirconocene and Methylalumoxane as Cocatalyst".

* cited by examiner

*Primary Examiner*—Robert D. Harlan
(74) *Attorney, Agent, or Firm*—McKenna Long & Aldridge LLP

(57) ABSTRACT

A catalyst system capable of producing a cyclic olefin polymer having a polar functional group and a high molecular weight with a high yield in which a catalyst is not deactivated due to polar functional groups of monomers, and a method of producing polymers using the same are provided. The catalyst system for polymerization of olefin according to the present invention has good thermal and chemical stability, and thus, in the method of preparing polyolefin using the catalyst system, the deactivation of a catalyst due to a polar functional group of the monomer can be prevented, and thus a high yield of the cyclic olefin polymer with a high molecular weight can be obtained when a ratio of the catalyst to the monomer is 1:5000, and the removal of a catalyst residue is not required.

10 Claims, 1 Drawing Sheet

US 7,648,937 B2

CATALYST SYSTEM FOR POLYMERIZING CYCLIC OLEFIN HAVING POLAR FUNCTIONAL GROUP, POLYMERIZING METHOD USING THE CATALYST SYSTEM, OLEFIN POLYMER PRODUCED BY THE METHOD AND OPTICAL ANISOTROPIC FILM COMPRISING THE OLEFIN POLYMER

CROSS-REFERENCE TO RELATED PATENT APPLICATION

This application claims the benefit of Korean Patent Application Nos. 10-2004-0074307, filed on Sep. 16, 2004 and 10-2005-0061152, filed on Jul. 7, 2005, in the Korean Intellectual Property Office, the disclosure of which is incorporated herein in its entirety by reference.

BACKGROUND OF THE INVENTION

1. Field of the Invention

The present invention relates to a catalyst for polymerizing a cyclic olefin having a polar functional group and a polymerization method, and more particularly, to a catalyst system for polymerizing a cyclic olefin having a polar functional group, a polymerization method using the same, an olefin polymer produced by the method, and an optical anisotropic film comprising the olefin polymer.

2. Description of the Related Art

Among catalyst systems used in polymerization reactions, a homogeneous Ziegler-Natta catalyst system which generally has multiple active sites includes methylaluminoxane (MAO) as a cocatalyst to improve the reactivity of the catalyst. However, a large amount of the MAO should be used relative to the catalyst precursor, and thus an increase in production cost and the requirement of post-treatment arise.

With appearance of single active site catalysts such as metallocene catalysts, a perfluoroarylborate type non-coordination anion capable of providing single cation active species to a catalyst precursor, having low charge of −1 or −2 and easily achieving delocalization of charges has been used as a cocatalyst (Chem. Rev. 1988, Vol. 88, 1405-1421; Chem. Rev. 1993, Vol. 93, 927-942).

Such an anion is used in the form of a salt in combination with trityl causing an alkide or hydride removal reaction or dialkylammonium cation causing protonolysis. Exemplary borate cocatalyst compounds include $[Ph_3C][B(C_6F_5)_4]$ and $[PhNMe_2H][B(C_6F_5)_4]$.

In the polymerization reaction, the cation part of a cocatalyst reacts with a leaving group of a metal precursor to provide a cationic metal precursor and forms an ion pair with the anion part of the cocatalyst. The anion weakly coordinates to the metal and is easily exchanged with an olefin monomer, resulting in polymerization.

The ion pair acts as a catalyst active species, but is thermally and chemically unstable and sensitive to solvents, monomers, etc., and thus reduces the reactivity of a catalyst. In particular, in the case of a nitrogen containing cocatalyst compound, a neutral amine compound is produced during a catalyst active reaction and can strongly interact with a cationic organometallic catalyst, thereby resulting in a reduction of the catalytic activity. To avoid this problem, carbenium, oxonium and sulfonium cations can be used instead of the ammonium cation (EP Patent No. 0426,637).

Meanwhile, when cyclic olefins are polymerized using MAO or organoaluminium, in most cases, high polymerization activity is shown against a non-polar norbornene such as norbornene, alkylnorbornene and silylnorbornene, whereas significantly low polymerization activity is shown against a polar norbornene such as ester or acetyl norbornene (U.S. Pat. Nos. 5,468,819, 5,569,730, 5,912,313, 6,031,058 and 6,455,650).

Norbornene polymers which are composed of cyclic olefin monomers such as norbornenes exhibit much better properties than conventional olefin polymers, such as high transparency, heat resistance and chemical resistance, and have low birefringence and moisture absorption. Thus, they have various applications, e.g., optical components such as CDs, DVDs and POFs (plastic optical fibers), information and electronic components such as capacitor films and low-dielectrics, and medical components such as low-absorbent syringes, blister packagings, etc. Adhesion of polymers to inorganic materials such as silicon, silicon oxide, silicon nitride, alumina, copper, aluminium, gold, silver, platinum, titanium, nickel, tantalum, and chromium is often a critical factor in the reliability of the polymer for use as an electronic material. The introduction of functional groups into norbornene monomers enables control of chemical and physical properties of a resultant norbornene polymer. However, in this case, a problem of reduction in reactivity occurs.

That is, although catalyst systems for polymerizing cyclic olefins having polar functional groups can be prepared using various cocatalysts, the resulting catalysts are sensitive to monomers and deactivated or not used at high temperatures due to poor thermal stability. Thus, the polymerization yield, the molecular weight of the resulting polymers, and the amount of catalyst used are not at practical desired levels, as in the case of general olefins having polar functional groups. When an excess of catalyst is used, the resulting polymer is colored or its transparency is deteriorated.

Therefore, there is a demand for a novel catalyst system capable of producing a cyclic olefin polymer having polar functional groups from a small amount of catalyst which has thermal and chemical stability to solvents, monomers, moisture and oxygen by simultaneously and properly controlling a cocatalyst structure and a procatalyst structure.

SUMMARY OF THE INVENTION

The present invention provides a catalyst system capable of producing a cyclic olefin polymer having polar functional groups and a high molecular weight in a high yield. The catalyst system has good thermal and chemical stability, and thus is not deactivated due to polar functional groups.

The present invention also provides a method for producing a cyclic olefin polymer having polar functional groups and a high molecular weight in a high yield by using the catalyst system.

The present invention also provides a cyclic olefin polymer with polar functional groups that has a high glass transition temperature, desirable thermal and oxidative stability, desirable chemical resistance and adhesion to metal.

The present invention also provides an optical anisotropic film made from a cyclic olefin polymer having polar functional groups.

According to an aspect of the present invention, there is provided a catalyst system for producing cyclic olefin polymers having polar functional groups, which comprises:

i) a procatalyst represented by formula (1) containing a group 10 metal and a ligand containing hetero atoms bonded to the metal;

ii) a cocatalyst represented by formula (2) including a salt compound which is capable of providing a phosphonium cation and an anion weakly coordinating to the metal of the procatalyst

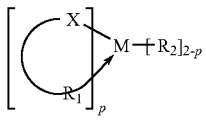

(1)

where X is a hetero atom selected from S, O and N;

$R_1$ is $-CH=CHR^{20}$, $-OR^{20}$, $-SR^{20}$, $-N(R^{20})_2$, $-N=NR^{20}$, $-P(R^{20})_2$, $-C(O)R^{20}$, $-C(R^{20})=NR^{20}$, $-C(O)OR^{20}$, $-OC(O)OR^{20}$, $-OC(O)R^{20}$, $-C(R^{20})=CHC(O)R^{20}$, $-R^{21}C(O)R^{20}$, $-R^{21}C(O)OR^{20}$ or $-R^{21}OC(O)R^{20}$, where $R^{20}$ is a hydrogen, a halogen, a linear or branched $C_{1-5}$ alkyl, a linear or branched $C_{1-5}$ haloalkyl, a linear or branched $C_{5-10}$ cycloalkyl, a linear or branched $C_{2-5}$ alkenyl, a linear or branched $C_{2-5}$ haloalkenyl, or an optionally substituted $C_{7-24}$ aralkyl, and $R^{21}$ is a $C_{1-20}$ hydrocarbylene;

$R_2$ is a linear or branched $C_{1-20}$ alkyl, alkenyl or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or $C_{3-20}$ alkynyl;

M is a group 10 metal; and p is an integer from 0 to 2, and

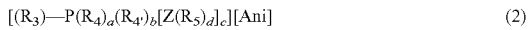

(2)

where each of a, b and c is an integer from 0 to 3, and a+b+c=3;

Z is O, S, Si or N;

d is 1 when Z is O or S, d is 2 when Z is N, and d is 3 when Z is Si;

$R_3$ is a hydrogen, an alkyl, or an aryl;

each of $R_4$, $R_4$' and $R_5$ is a hydrogen; a linear or branched $C_{1-20}$ alkyl, alkoxy, allyl, alkenyl or vinyl; a $C_{3-12}$ cycloalkyl optionally substituted by a hydrocarbon; a $C_{6-40}$ aryl optionally substituted by a hydrocarbon; a $C_{7-15}$ aralkyl optionally substituted by a hydrocarbon; a $C_{3-20}$ alkynyl; a tri(linear or branched $C_{1-10}$ alkyl)silyl; a tri(linear or branched $C_{1-10}$ alkoxy)silyl; a tri(optionally substituted $C_{3-12}$ cycloalkyl)silyl; a tri(optionally substituted $C_{6-40}$ aryl)silyl; a tri(optionally substituted $C_{6-40}$ aryloxy)silyl; a tri(linear or branched $C_{1-10}$ alkyl)siloxy; a tri(optionally substituted $C_{3-12}$ cycloalkyl)siloxy; or a tri(optionally substituted $C_{6-40}$ aryl) siloxy, in which each substituent is a halogen or $C_{1-20}$ haloalkyl; and

[Ani] is an anion capable of weakly coordinating to the metal M of the procatalyst and is selected from the group consisting of borate, aluminate, $[SbF_6]-$, $[PF_6]-$, $[AsF_6]-$, perfluoroacetate($[CF_3CO_2]-$), perfluoropropionate($[C_2F_5CO_2]-$), perfluorobutyrate($[CF_3CF_2CF_2CO_2]-$), perchlorate($[ClO_4]-$), p-toluenesulfonate($[p-CH_3C_6H_4SO_3]-$), $[SO_3CF_3]-$, boratabenzene, and carborane optionally substituted with a halogen.

In the catalyst system, the borate or aluminate of formula (2) may be an anion represented by formula (2a) or (2b):

$[M'(R_6)_4]$ (2a), $[M'(OR_6)_4]$ (2b)

where M' is B or Al;

$R_6$ is a halogen, a linear or branched $C_{1-20}$ alkyl or alkenyl optionally substituted by a halogen, a $C_{3-12}$ cycloalkyl optionally substituted by a halogen, a $C_{6-40}$ aryl optionally substituted by a hydrocarbon, a $C_{6-40}$ aryl optionally substituted by a linear or branched $C_{3-20}$ trialkylsiloxy or a linear or branched $C_{18-48}$ triarylsiloxy, or a $C_{7-15}$ aralkyl optionally substituted by a halogen.

In the catalyst system, the procatalyst represented by formula (1) and the cocatalyst represented by formula (2) may be a group 10 metal containing compound represented by formula (3) and a phosphonium compound represented by formula (4), respectively;

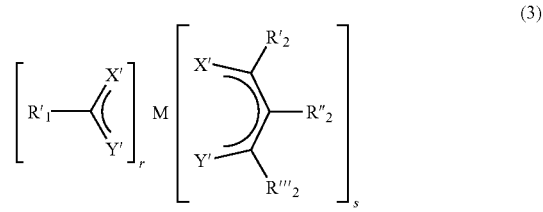

(3)

where each of X' and Y' is a hetero atom selected from S and O;

each of $R_1'$, $R_2'$, $R_2''$ and $R_2'''$ is a linear or branched $C_{1-20}$ alkyl, alkenyl or vinyl; a $C_{5-12}$ cycloalkyl optionally substituted by a hydrocarbon; a $C_{6-40}$ aryl optionally substituted by a hydrocarbon; a $C_{7-15}$ aralkyl optionally substituted by a hydrocarbon; or a $C_{3-20}$ alkynyl;

M is a group 10 metal; and each of r and s is an integer from 0 to 2 and r+s=2, and

(4)

where $R_4$ is a hydrogen; a linear or branched $C_{1-20}$ alkyl, alkoxy, allyl, alkenyl or vinyl; an optionally substituted $C_{3-12}$ cycloalkyl; an optionally substituted $C_{6-40}$ aryl; an optionally substituted $C_{7-15}$ aralkyl; or a $C_{3-20}$ alkynyl, in which each substituent is a halogen or a $C_{1-20}$ haloalkyl; and

[Ani] is an anion capable of weakly coordinating to the metal M of the procatalyst represented by formula (1) and is selected from the group consisting of borate, aluminate, $[SbF_6]-$, $[PF_6]-$, $[AsF_6]-$, perfluoroacetate($[CF_3CO_2]-$), perfluoropropionate($[C_2F_5CO_2]-$), perfluorobutyrate($[CF_3CF_2CF_2CO_2]-$), perchlorate($[ClO_4]-$), p-toluenesulfonate($[p-CH_3C_6H_4SO_3]-$), $[SO_3CF_3]-$, boratabenzene, and carborane optionally substituted by a halogen.

In the catalyst system, the procatalyst represented by formula (1) and the cocatalyst represented by formula (2) may be a palladium compound represented by formula (3a) and a phosphonium compound represented by formula (4), respectively;

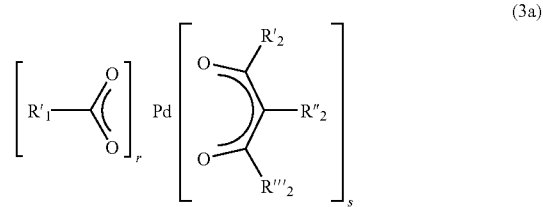

(3a)

where each of $R_1'$, $R_2'$, $R_2''$ and $R_2'''$ is a linear or branched $C_{1-20}$ alkyl, alkenyl or vinyl; a $C_{5-12}$ cycloalkyl optionally substituted by a hydrocarbon; a $C_{6-40}$ aryl optionally substituted by a hydrocarbon; a $C_{7-15}$ aralkyl optionally substituted by a hydrocarbon; or a $C_{3-20}$ alkynyl; and each of r and s is an integer from 0 to 2 and r+s=2, and $$[H-P(R_4)_3][Ani] \quad (4)$$

where $R_4$ and [Ani] are as defined above.

In the catalyst system, the procatalyst may be a compound represented by formula (1) in which the metal is Pd, p is 2, and the ligand having a hetero atom directly coordinating to the metal is acetylacetonate or acetate, and the cocatalyst may be a compound represented by formula (2) in which b is 0, c is 0, $R_3$ is H, and $R_4$ is cyclohexyl, isopropyl, t-butyl, n-butyl or ethyl.

In the catalyst system, the molar ratio of the cocatalyst to the procatalyst is in the range of 0.5:1 to 10:1.

In the catalyst system, a catalyst mixture including the procatalyst and the cocatalyst may be supported on an inorganic support.

In the catalyst system, the inorganic support may be at least one selected from the group consisting of silica, titania, silica/chromia, silica/chromia/titania, silica/alumina, aluminum phosphate gel, silanized silica, silica hydrogel, montmorillonite clay and zeolite.

In the catalyst system, the catalyst mixture including the procatalyst and the cocatalyst may be dissolved in an organic solvent selected from the group consisting of dichloromethane, dichloroethane, toluene, chlorobenzene and a mixture thereof.

In the catalyst system, the catalyst mixture may include a metal catalyst complex composed of the procatalyst and the cocatalyst.

According to another aspect of the present invention, there is provided a method of producing cyclic olefin polymers having polar functional groups, which comprises:

preparing the catalyst system mixture according to the previous aspect of the present invention; and addition-polymerizing cyclic olefin monomers having polar functional groups in the presence of an organic solvent and the catalyst system mixture at a temperature of 80-150° C.

In the method, the cyclic olefin monomer is a compound represented by formula (5):

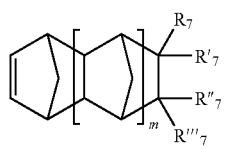
(5)

where m is an integer from 0 to 4;

at least one of $R_7$, $R_7'$, $R_7''$ and $R_7'''$ is a polar functional group and the others are nonpolar functional groups;

$R_7$, $R_7'$, $R_7''$ and $R_7'''$ can be bonded together to form a saturated or unsaturated $C_{4-12}$ cyclic group or a $C_{6-24}$ aromatic ring;

the nonpolar functional group is a hydrogen; a halogen; a linear or branched $C_{1-20}$ alkyl, haloalkyl, alkenyl or haloalkenyl; a linear or branched $C_{3-20}$ alkynyl or haloalkynyl; a $C_{3-12}$ cycloalkyl optionally substituted by an alkyl, an alkenyl, an alkynyl, a halogen, a haloalkyl, a haloalkenyl or haloalkynyl; a $C_{6-40}$ aryl optionally substituted by an alkyl, an alkenyl, an alkynyl, a halogen, a haloalkyl, a haloalkenyl or haloalkynyl; or a $C_{7-15}$ aralkyl optionally substituted by an alkyl, an alkenyl, an alkynyl, a halogen, a haloalkyl, a haloalkenyl or haloalkynyl;

the polar functional group is a non-hydrocarbonaceous polar group having at least one O, N, P, S, Si or B and is —$R^8OR^9$, —$OR^9$, —$OC(O)OR^9$, —$R^8OC(O)OR^9$, —$C(O)R^9$, —$R^8C(O)OR^9$, —$C(O)OR^9$, —$R^8C(O)R^9$, —$OC(O)R^9$, —$R^8OC(O)R^9$, —$(R^{80})_k$—$OR^9$, —$(OR^8)_k$—$OR^9$, —$C(O)$—$O$—$C(O)R^9$, —$R^8C(O)$—$O$—$C(O)R^9$, —$SR^9$, —$R^8SR^9$, —$SSR^8$, —$R^8SSR^9$, —$S(=O)R^9$, —$R^8S(=O)R^9$, —$R^8C(=S)R^9$, —$R^8C(=S)SR^9$, —$R^8SO_3R^9$, —$SO_3R^9$, —$R^8N=C=S$, —NCO, $R^8$—NCO, —CN, —$R^8CN$, —$NNC(=S)R^9$, —$R^8NNC(=S)R^9$, —$NO_2$, —$R^8NO_2$,

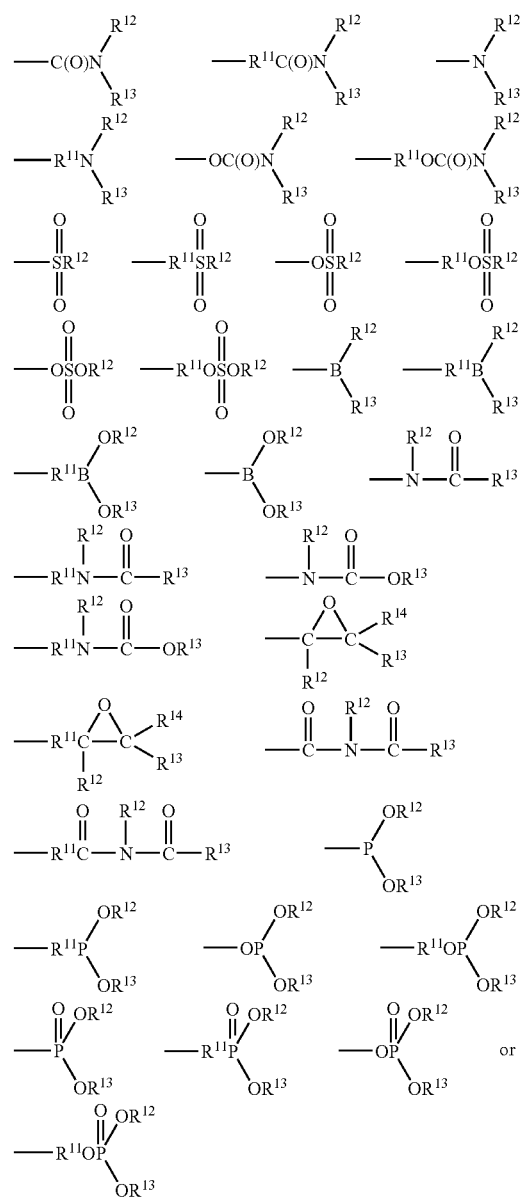

where each of $R^8$ and $R^{11}$ is a linear or branched $C_{1-20}$ alkylene, haloalkylene, alkenylene or haloalkenylene; a linear or branched $C_{3-20}$ alkynylene or haloalkynylene; a $C_{3-12}$ cycloalkylene optionally substituted by an alkyl, an alkenyl, an alkynyl, a halogen, a haloalkyl, a haloalkenyl or haloalkynyl; a $C_{6-40}$ arylene optionally substituted by an alkyl, an alkenyl, an alkynyl, a halogen, a haloalkyl, a haloalkenyl or haloalkynyl; or a $C_{7-15}$ aralkylene optionally substituted by an alkyl, an alkenyl, an alkynyl, a halogen, a haloalkyl, a haloalkenyl or haloalkynyl;

each of $R^9$, $R^{10}$, $R^{12}$ and $R^{13}$ is a hydrogen; a halogen; a linear or branched $C_{1-20}$ alkyl, haloalkyl, alkenyl or haloalkenyl; a linear or branched $C_{3-20}$ alkynyl or haloalkynyl; a $C_{3-12}$ cycloalkyl optionally substituted by an alkyl, an alkenyl, an alkynyl, a halogen, a haloalkyl, a haloalkenyl or haloalkynyl; a $C_{6-40}$ aryl optionally substituted by an alkyl, an alkenyl, an alkynyl, a halogen, a haloalkyl, a haloalkenyl or haloalkynyl; a $C_{7-15}$ aralkyl optionally substituted by an alkyl, an alkenyl, an alkynyl, a halogen, a haloalkyl, a haloalkenyl or haloalkynyl; or an alkoxy, an haloalkoxy, a carbonyloxy or a halocarbonyloxy; and k is an integer from 1 to 10.

In the method, a total amount of the organic solvent may be 50-800% based on the weight of the total monomer in the monomer solution In the method, the catalyst mixture may be added in a solid phase to the monomer solution.

In the method, the amount of the catalyst mixture may be such that a molar ratio of the procatalyst to the total monomer is 1:2,500 to 1:200,000.

In the method, the monomer solution may further include a cyclic olefin compound having no polar functional group.

In the method, the monomer solution may further include a linear or branched $C_{1-20}$ olefin.

According to another aspect of the present invention, there is provided a polymer produced using the method described above, which is an addition polymer of a cyclic olefin monomer having a polar functional group represented by formula (5) and has a weight average molecular weight $M_w$ of 10,000-1,000,000:

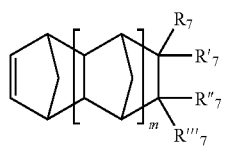  (5)

where m, $R_7$, $R_7'$, $R_7''$ and $R_7'''$ are as defined above.

The cyclic olefin polymers having polar functional groups may include a cyclic olefin homopolymer, a copolymer of cyclic olefin monomers having different polar functional groups, or a copolymer of a cyclic olefin monomer having a polar functional group and a cyclic olefin monomer having no polar functional group.

According to another aspect of the present invention, there is provided an optical anisotropic film including a cyclic olefin polymer having a polar functional group.

The optical anisotropic film may have a retardation value $R_{th}$ represented by Equation (1) of 70-1000 nm:

$$R_{th} = \Delta(n_y - n_z) \times d \quad (1)$$

where $n_y$ is the refractive index along an in-plane fast axis measured at 550 nm; $n_z$ is the refractive index in a direction through the film thickness measured at 550 nm; and d is the thickness of the anisotropic film.

The optical anisotropic film may be a negative C-plate type optical compensation film for liquid crystal display, satisfying $n_x \cong n_y > n_z$, where $n_x$ is the refractive index along an in-plane slow axis.

DETAILED DESCRIPTION OF THE INVENTION

Figure 1:
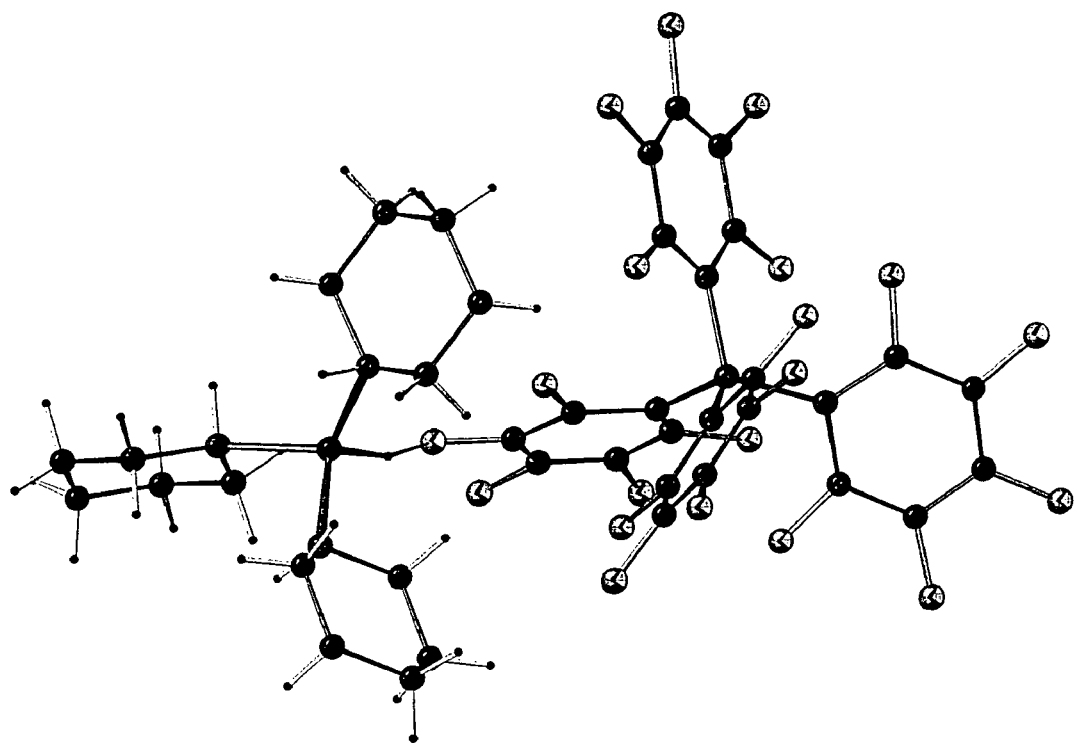
FIG. 1 represents a molecular structure of tricyclohexylphosphonium (tetrakispentafluorophenyl)borate.

A catalyst system for polymerization of olefin according to the present invention has good thermal and chemical stability, and thus, in a method of preparing polyolefin using the catalyst system, the deactivation of a catalyst due to a polar functional group of the monomer can be prevented, and thus a high yield of the cyclic olefin polymer with a high molecular weight can be obtained from a small amount of the catalyst and the removal of a catalyst residue is not required.

A catalyst system according to an embodiment of the present invention includes: (i) a procatalyst represented by formula (1) containing a group 10 metal and a ligand containing hetero atoms bonded to the metal and (ii) a cocatalyst represented by formula (2) including a salt compound which is capable of providing a phosphonium cation and an anion weakly coordinating to the metal of the procatalyst. The procatalyst is very stable even in the presence of a monomer having a polar functional group and the phosphonium cocatalyst does not generate an amine, which is produced by ammonium borate and poisons a catalyst. Further, in a reaction between the procatalyst and the cocatalyst, a phosphine is formed to stabilize the cationic species, thereby inhibiting the deactivation of the catalyst by a polar functional group of a monomer.

In the catalyst system, the borate or aluminate of formula (2) may be an anion represented by formula (2a) or (2b):

$$[M'(R_6)_4] \quad (2a),$$

$$[M'(OR_6)_4] \quad (2b)$$

where M' is B or Al; $R_6$ is a halogen, a $C_{1-20}$ alkyl or alkenyl optionally substituted by a halogen, a $C_{3-12}$ cycloalkyl optionally substituted by a halogen, a $C_{6-40}$ aryl optionally substituted by a $C_{3-20}$ hydrocarbon, a $C_{6-40}$ aryl substituted by a linear or branched $C_{3-20}$ trialkylsiloxy or a linear or branched $C_{18-48}$ triarylsiloxy, or a $C_{7-15}$ aralkyl optionally substituted by a halogen.

In the catalyst system, the procatalyst represented by formula (1) and the cocatalyst represented by formula (2) may be a compound represented by formula (3) and a compound represented by formula (4), respectively;

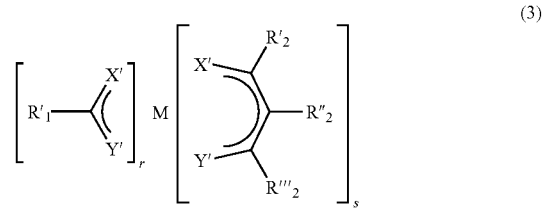  (3)

where each of X' and Y' is a hetero atom selected from S and O; each of $R_1'$, $R_2'$, $R_2''$ and $R_2'''$ is a linear or branched $C_{1-20}$ alkyl, alkenyl or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or a $C_{3-20}$ alkynyl; M is a group 10 metal; and each of r and s is an integer from 0 to 2 and r+s=2, and

where $R_4$ is a hydrogen, a linear or branched $C_{1-20}$ alkyl, alkoxy, allyl, alkenyl or vinyl, an optionally substituted $C_{3-12}$ cycloalkyl, an optionally substituted $C_{6-40}$ aryl, an optionally substituted $C_{7-15}$ aralkyl, or a $C_{3-20}$ alkynyl, in which each substituent is a halogen or a $C_{1-20}$ haloalkyl; and [Ani] is an anion capable of weakly coordinating to the metal M of the procatalyst represented by formula (1) and is selected from the group consisting of borate, aluminate, [SbF$_6$]—, [PF$_6$]—, [AsF$_6$]—, perfluoroacetate([CF$_3$CO$_2$]—), perfluoropropionate([C$_2$F$_5$CO$_2$]—), perfluorobutyrate ([CF$_3$CF$_2$CF$_2$CO$_2$]—), perchlorate([ClO$_4$]—), p-toluenesulfonate([p-CH$_3$C$_6$H$_4$SO$_3$]—), [SO$_3$CF$_3$]—, boratabenzene, and carborane optionally substituted by a halogen.

In the catalyst system, the procatalyst represented by formula (1) and the cocatalyst represented by formula (2) may be a palladium compound represented by formula (3a) and a phosphonium compound represented by formula (4), respectively;

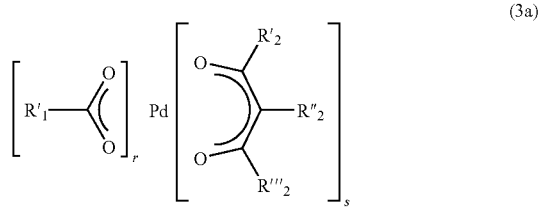

where each of $R_1'$, $R_2'$, $R_2''$ and $R_2'''$ is a linear or branched $C_{1-20}$ alkyl, alkenyl or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or a $C_{3-20}$ alkynyl; and each of r and s is an integer from 0 to 2 and r+s=2, and

where $R_4$ and [Ani] are as defined above.

In the procatalyst represented by formula (1), the metal may be Pd, p may be 2, and the ligand having a hetero atom directly coordinating to Pd may be acetylacetonate or acetate, and in the cocatalyst including a salt compound having a phosphonium represented by formula (2), b may be 0, c may be 0, $R_3$ may be H, and $R_4$ may be cyclohexyl, isopropyl, t-butyl, n-butyl or ethyl.

A catalyst mixture forming the catalyst system of the present embodiment and including (i) a procatalyst represented by formula (1) containing a group 10 metal and a ligand containing hetero atoms bonded to the metal and (ii) a cocatalyst represented by formula (2) including a salt compound which is capable of providing a phosphonium cation and a weakly coordinating anion does not decompose at the polymerization temperature of 80-150° C., is stable in the presence of polar functional groups, and shows high activity.

The phosphonium compound used as the cocatalyst in the catalyst system has an electronically stabilizing ability and thermally and chemically activates transition metal compounds. In the catalyst system, the molar ratio of the cocatalyst to the procatalyst containing the group 10 transition metal is in the range of 0.5:1-10:1. When the molar ratio of the cocatalyst to the procatalyst is less than 0.5:1, the effect of activating the procatalyst is insufficient. When the molar ratio of the cocatalyst to the procatalyst is greater than 10:1, an excess of a phosphonium compound coordinates to the metal to prevent a norbornene monomer from coordinating to the metal and the cationic catalyst active species is too electronically stabilized to interact with the double bond of a norbornene monomer, thereby resulting in a decrease in both polymerization yield and molecular weight.

The catalyst mixture including the procatalyst and the cocatalyst may be supported on an inorganic support. The inorganic support may be silica, titania, silica/chromia, silica/chromia/titania, silica/alumina, aluminum phosphate gel, silanized silica, silica hydrogel, montmorillonite clay or zeolite. When the catalyst mixture is supported on an inorganic support, a molecular weight distribution of a polymer can be controlled by appropriately selecting the inorganic support and the polymer morphology can be improved.

The catalyst mixture can be used in a solid phase without a solvent or can be mixed in a solvent to form a preformed catalyst in the form of a mixture or a complex of the respective catalyst components, i.e. the group 10 metal compound and the phosphonium compound. Further, each of the catalyst components can be directly added to the polymerization reaction system without being preformed. Solvents in which the catalyst mixture may be dissolved include dichloromethane, dichloroethane, toluene, chlorobenzene or a mixture thereof.

The catalyst mixture may be a metal catalyst complex composed of the procatalyst and the cocatalyst.

A method of producing cyclic olefin polymers having polar functional groups according to an embodiment of the present invention includes: preparing a catalyst mixture including (i) a procatalyst represented by formula (1) containing a group 10 metal and a ligand containing hetero atoms bonded to the metal and (ii) a cocatalyst represented by formula (2) including a salt compound which is capable of providing a phosphonium cation and an anion weakly coordinating to the metal of the procatalyst; and addition-polymerizing cyclic olefin monomers having polar functional groups in the presence of an organic solvent and the catalyst mixture at a temperature of 80-150° C.

As to a polymerization temperature, in the case of general organometallic polymerization catalysts, when the polymerization temperature increases, the polymerization yield increases, whereas a molecular weight of a polymer decreases or catalysts lose the polymerization activity by thermal decomposition (Kaminsky et al. Angew. Chem. Int. Ed., 1985, vol 24, 507; Brookhart et al. Chem. Rev. 2000, vol 100, 1169; Resconi et al. Chem. Rev. 2000, vol 100, 1253). When the polymerization temperature increases, β-hydrogen of a growing polymer chain bonded to the metal is eliminated and the growing polymer chain departs from the metal, thereby resulting in a decrease of the molecular weight.

Meanwhile, a polar group of a norbornene monomer interacts with the catalyst at room temperature to prevent the double bond of a norbornene from coordinating to an active site of the catalyst, thereby resulting in a decrease in the polymerization yield and the molecular weight. However, when the polymerization temperature increases, the double bond of a norbornene is easy to insert into the metal-growing polymer chain bond to increase the activity and a β-hydrogen of a growing polymer chain bonded to the metal cannot form a stereo structural environment to be eliminated where it can interact with the catalyst in view of inherent properties of the norbornene monomer, thereby increasing the molecular weight of the polymer (Kaminsky et al. Macromol. Symp. 1995, vol 97, 225). Thus, it is necessary to increase the polymerization temperature. However, most catalysts conventionally used to produce polynorbornenes having polar functional groups tend to decompose at 80° C. or higher, and thus polymers having high molecular weights cannot be obtained with a high yield.

However, the catalyst of the present embodiment is structurally stable at 80° C. or higher and prevents an interaction between the polar functional group of the norbornene monomer and the cationic catalyst, and thus a catalyst active site can be formed or recovered, thereby producing a high molecular weight cyclic olefin polymer having a polar functional group with a high yield. When the polymerization temperature is higher than 150° C., catalyst components are decomposed in solution, and thus it is difficult to produce a cyclic olefin polymer having a polar functional group and a high molecular weight with a high yield.

The cyclic olefin monomer used in the method is a norbornene-based monomer having a polar functional group. A norbornene-based monomer or norbornene derivative is a monomer having at least one norbornene (bicyclo[2.2.2]hept-2-ene) unit. The norbornene-based monomer is represented by formula (5):

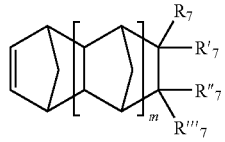

(5)

where m is an integer from 0 to 4; at least one of $R_7$, $R_7'$, $R_7''$ and $R_7'''$ is a polar functional group and the others are nonpolar functional groups; $R_7$, $R_7'$, $R_7''$ and $R_7'''$ can be bonded together to form a saturated or unsaturated $C_{4-12}$ cyclic group or a $C_{6-24}$ aromatic ring, in which the nonpolar functional group is a hydrogen, a halogen, a linear or branched $C_{1-20}$ alkyl, haloalkyl, alkenyl or haloalkenyl, a linear or branched $C_{3-20}$ alkynyl or haloalkynyl, a $C_{3-12}$ cycloalkyl optionally substituted by an alkyl, an alkenyl, an alkynyl, a halogen, a haloalkyl, a haloalkenyl or haloalkynyl, a $C_{6-40}$ aryl optionally substituted by an alkyl, an alkenyl, an alkynyl, a halogen, a haloalkyl, a haloalkenyl or haloalkynyl, or a $C_{7-15}$ aralkyl optionally substituted by an alkyl, an alkenyl, an alkynyl, a halogen, a haloalkyl, a haloalkenyl or haloalkynyl; and the polar functional group is a non-hydrocarbonaceous polar group having at least one O, N, P, S, Si or B and is —$R^8OR^9$, —$OR^9$, —$OC(O)OR^9$, —$R^8OC(O)OR^9$, —$C(O)R^9$, —$R^8C(O)OR^9$, —$C(O)OR^9$, —$R^8C(O)R^9$, —$OC(O)R^9$, —$R^8OC(O)R^9$, —$(R^8O)_k$—$OR^9$, —$(OR^8)_k$—$OR^9$, —$C(O)$—$O$—$C(O)R^9$, —$R^8C(O)$—$O$—$C(O)R^9$, —$SR^9$, —$R^8SR^9$, —$SSR^8$, —$R^8SSR^9$, —$S(=O)R^9$, —$R^8S(=O)R^9$, —$R^8C(=S)R^9$, —$R^8C(=S)SR^9$, —$R^8SO_3R^9$, —$SO_3R^9$, —$R^8N=C=S$, —NCO, $R^8$—NCO, —CN, —$R^8CN$, —NNC(=S)$R^9$, —$R^8NNC(=S)R^9$, —$NO_2$, —$R^8NO_2$,

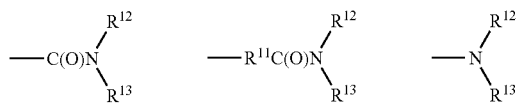

-continued

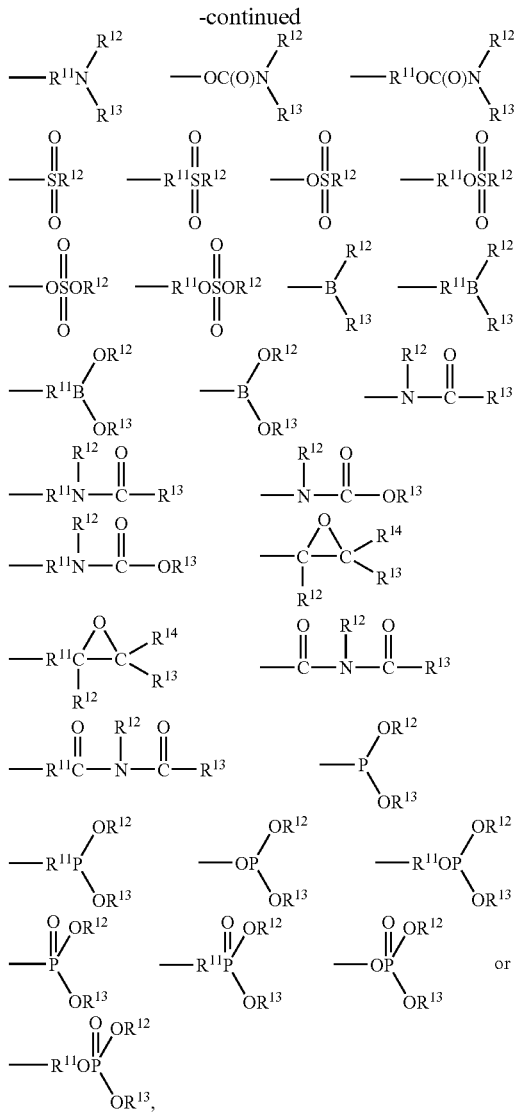

where each of $R^8$ and $R^{11}$ is a linear or branched $C_{1-20}$ alkylene, haloalkylene, alkenylene or haloalkenylene, a linear or branched $C_{3-20}$ alkynylene or haloalkynylene, a $C_{3-12}$ cycloalkylene optionally substituted by an alkyl, an alkenyl, an alkynyl, a halogen, a haloalkyl, a haloalkenyl or haloalkynyl, a $C_{6-40}$ arylene optionally substituted by an alkyl, an alkenyl, an alkynyl, a halogen, a haloalkyl, a haloalkenyl or haloalkynyl, or a $C_{7-15}$ aralkylene optionally substituted by an alkyl, an alkenyl, an alkynyl, a halogen, a haloalkyl, a haloalkenyl or haloalkynyl; each of $R^9$, $R^{10}$, $R^{12}$ and $R^{13}$ is a hydrogen, a halogen, a linear or branched $C_{1-20}$ alkyl, haloalkyl, alkenyl or haloalkenyl, a linear or branched $C_{3-20}$ alkynyl or haloalkynyl, a $C_{3-12}$ cycloalkyl optionally substituted by an alkyl, an alkenyl, an alkynyl, a halogen, a haloalkyl, a haloalkenyl or haloalkynyl, a $C_{6-40}$ aryl optionally substituted by an alkyl, an alkenyl, an alkynyl, a halogen, a haloalkyl, a haloalkenyl or haloalkynyl, a $C_{7-15}$ aralkyl optionally substituted by an alkyl, an alkenyl, an alkynyl, a halogen, a haloalkyl, a haloalkenyl or haloalkynyl, or an alkoxy, an haloalkoxy, a carbonyloxy or a halocarbonyloxy; and k is an integer from 1 to 10.

In the polymerization method, the total amount of the organic solvent in the reaction system may be 50-800%, and preferably 50-400%, by weight based on the total weight of the monomer in the monomer solution. When the total amount of the organic solvent in the reaction system is less than 50% based on the total weight of the monomer in the monomer solution, the mixing during the polymerization reaction is difficult due to the high viscosity of the polymer solution. When the total amount of the organic solvent in the reaction system is greater than 800% based on the total weight of the monomer in the monomer solution, both the polymerization yield and the molecular weight are reduced due to a low polymerization rate.

In the polymerization method, the molar ratio of the catalyst mixture based on the group 10 transition metal compound to the monomers contained in the monomer solution is in the range of 1:2,500-1:200,000. This ratio of the catalyst to the monomers is far smaller than that used in a conventional polymerization reaction system for preparing a polar cyclic olefin polymer, however it is sufficient to exhibit catalytic activity in the method of preparing a high molecular weight cyclic olefin polymer according to the present embodiment. Preferably, the molar ratio of the catalyst system to the monomers is in the range of 1:5,000~1:20,000.

In the method, the monomer solution may further include cyclic olefin having a non-polar functional group.

In the method, norbornene monomers and catalysts are dissolved in a solvent, mixed, and then polymerized, as a conventional polymerization method of norbornene polymer. By performing the method of the present embodiment, the cyclic olefin polymer containing polar functional groups having a molecular weight of 100,000 or more can be prepared with a yield of 40% or higher. In order to fabricate an optical film using the cycloolefin polymer, the molecular weight of the cycloolefin polymer is preferably controlled to 100,000-1,000,000. To control the molecular weight, a linear or branched cyclic $C_{1-20}$ olefin may be further used. Examples of the olefin include 1-hexene, 1-octene, cyclopentene, ethylene, etc. Such an olefin is added to the end of an extending polymer chain and a β-hydrogen of the added olefin is easily eliminated, thereby producing a polymer having a desirable molecular weight.

In a conventional polymerization method, cyclic olefin polymers containing polar functional groups are prepared with a very low yield and a low molecular weight, whereas the present method produces a high molecular weight cycloolefin polymer containing polar functional groups with a high yield.

A cyclic olefin polymer having a polar group according to an embodiment of the present invention is provided. Preferably, a norbornene-based polymer having a polar functional group produced according to the method of the previous embodiment is an addition-polymer of a cyclic olefinic monomer represented by formula (5) and has a weight average molecular weight ($M_w$) of 10,000-1,000,000.

A norbornene addition polymer having a polar functional group produced using the method of the present embodiment includes at least 0.1-99.9 mol % of a norbornene-based monomer having a polar functional group, in which the norbornene having a polar functional group is composed of a mixture of endo and exo isomers and the deterioration of the catalytic activity by endo-isomers containing polar functional groups can be avoided and thus a composition ratio of the mixture is not critical for polymerization performance.

In accordance with the method of the invention, a homopolymer is prepared by polymerizing same norbornene-based monomer containing a polar functional group, or a copolymer including di-, tri- and multi-copolymers is prepared by polymerizing different polar functional norbornene-based monomers, or a copolymer including di-, tri- and multi-copolymers is prepared by polymerizing a polar functional norbornene-based monomer and a norbornene monomer having a non-polar functional group.

The norbornene-based polymer containing polar functional groups prepared in accordance with the method of the present invention is transparent, has sufficient adhesion to metals or polymers containing different polar functional groups, thermal stability and strength, and exhibits a low dielectric constant sufficient to be used as insulating electronic materials. The cyclic olefin polymer produced by the present invention has a desirable adhesion to substrates of electronic components without requiring a coupling agent, and at the same time, a sufficient adhesion to metal substrates, e.g., Cu, Ag and Au. Further, the cyclic olefin polymer of the present invention exhibits desirable optical properties so that it can be used as materials for protective films of polarizing plates and electronic components such integrated circuits (ICs), printed circuit boards, multichip modules, and the like.

The polymer of the present embodiment can be used to produce an optical anisotropic film capable of controlling birefringence, which could not be produced with the conventional method.

A conformational unit of a general cyclic olefin has one or two stable rotation conditions, and thus can achieve an extended form such as polyamide having a rigid phenyl ring as a backbone. When a polar functional group is introduced into a norbornene-based polymer with an extended form, the interaction between molecules increases compared to polymers having simple forms, and thus packing of molecules has a directional order, thereby producing optical and electronic anisotropy.

The birefringence can be controlled according to the type and the amount of the polar functional group in the cyclic olefin polymer. In particular, the birefringence in a direction through the film thickness is easily controlled, and thus the polymer of the present embodiment can be used to produce an optical compensation film for various modes of a liquid crystal display (LCD).

The optical anisotropic film of the cyclic olefin polymer having a polar functional group can be prepared by solution casting or can be prepared with a blend of one or more cyclic olefin polymers.

In order to prepare a film by solution casting, it is preferable to introduce a cyclic olefin polymer in a solvent in amount of 5-95% by weight, and preferably 10-60% by weight, and stirring the mixture at room temperature. The viscosity of the prepared solution is 100-10,000 cps, and more preferably 300-8000 cps for solution casting. To improve the mechanical strength, heat resistance, light resistance, and manipulability of the film, additives such as a plasticizer, an anti-deterioration agent, a UV stabilizer or an antistatic agent can be added.

The optical anisotropic film thus prepared has a retardation value ($R_{th}$) of 70 to 1000 nm, as defined by the following Equation 1:

$$R_{th} = \Delta(n_y - n_z) \times d \quad (1)$$

where $n_y$ is the refractive index along an in-plane fast axis measured at 550 nm, nz is the refractive index toward thickness direction measured at 550 nm, and d is a film thickness.

The optical anisotropic film satisfies $n_x \cong n_y > n_z$, where $n_x$ is the refractive index along an in-plane slow axis, and thus can be used as a negative C-plate type optical compensation film for an LCD.

Hereinafter, the present invention will be described in more detail with reference to the following Examples. However, these Examples are given for the purpose of illustration and are not to be construed as limiting the scope of the invention.

In the following Preparation Examples and Examples, all operations handling compounds sensitive to air or water were carried out using a standard Schlenk technique or a dry box technique. Nuclear magnetic resonance spectra were obtained using a Bruker 300 spectrometer. $^1$H NMR was obtained at 300 MHz, $^{13}$C NMR at 75 MHz. The molecular weight and the molecular weight distribution of a polymer were determined by gel permeation chromatography (GPC) using standard polystyrene samples. Thermal analysis, such as TGA and DSC, was performed using TA Instrument (TGA 2050; heating rate 10 K/min). Toluene, hexane and $Et_2O$ were distilled and purified in potassium/benzophenone and $CH_2Cl_2$, and chlorobenzene was distilled and purified in $CaH_2$.

Preparation of Monomer Having Polar Functional Group

PREPARATION EXAMPLE 1

Preparation of 5-norbornene-2-carboxylic methylester

Dicyclopentadiene (DCPD, available from Aldrich, 256.5 mL, 1.9 mol), methylacrylate (available from Aldrich, 405 mL, 4.5 mol) and hydroquinone (3.2 g, 0.03 mol) were charged into a 2 L high pressure reactor and heated to 220° C. The mixture was stirred at 300 rpm for 5 hours. After the reaction was completed, the resultant was cooled and transferred to a distiller. Vacuum distillation was carried out at 50° C. using a vacuum pump at 1 torr to obtain the product (yield: 57.6%, exo/endo=58/42).

$^1$H-NMR (600 MHz, $CDCl_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

PREPARATION EXAMPLE 2

Preparation of 5-norbornene-2-allylacetate

DCPD (available from Aldrich, 248 mL, 1.852 mol), allylacetate (available from Aldrich, 500 mL, 4.63 mol) and hydroquinone (0.7 g, 0.006 mol) were charged into a 2 L high pressure reactor and heated to 190° C. The mixture was stirred at 300 rpm for 5 hours. After the reaction was completed, the resultant was cooled and transferred to a distiller. Vacuum distillation was carried out 2 times at 56° C. using a vacuum pump at 1 torr to obtain the product (yield: 30%, exo/endo=57/43).

$^1$H-NMR (300 MHz, $CDCl_3$): δ 6.17~5.91 (m, 2H), 4.15~3.63 (m, 2H), 2.91~2.88 (m, 2H), 2.38 (m, 1H), 2.05 (s, 3H), 1.83 (m, 1H), 1.60~1.25 (m, 2H), 0.57 (m, 1H).

Preparation of Cocatalyst

PREPARATION EXAMPLE 3

Preparation of $(Cy)_3PHCl$ $(Cy)_3P$ (2.02 g, 7.2 mmol; Cy=cyclohexyl) was dispersed in $Et_2O$ (150 mL) in a 250 mL Schlenk flask. Then, anhydrous HCl (14.4 mL, 1.0 M in ether) was added to the solution at room temperature to give a white solid. After stirring for about 20 minutes, the solid was filtered through a glass filter and washed three times with $Et_2O$ (80 mL). Thereafter, the residual solvent was removed at room temperature in vacuum to obtain $(Cy)_3PHCl$ (86%, 1.95 g).

$^1$H-NMR (600 MHz, $CD_2Cl_2$): δ7.02~6.23 (d, 1H, $J_{H-P}$=470 Hz), 2.56~1.30 (m, 33H); $^{13}$C-NMR (600 MHz, $CD_2Cl_2$): δ28.9 (d), 28.5 (d), 26.8 (d), 25.6 (s). $^{31}$P-NMR (600 MHz, $CD_2Cl_2$): δ 22.98 (d, $J_{P-H}$=470 Hz).

PREPARATION EXAMPLE 4

Preparation of $(n-Bu)_3PHCl$ $(n-Bu)_3P$ (2.0 g, 10.0 mmol, n-Bu=n-butyl) was dispersed in $Et_2O$ (150 mL) in a 250 mL Schlenk flask. Then, anhydrous HCl (20.0 mL, 1.0 M in ether) was added to the solution at room temperature to give a white solid. After stirring for about 20 minutes, the solid was filtered through a glass filter and washed three times with $Et_2O$ (80 mL). Thereafter, the residual solvent was removed at room temperature in vacuum to obtain $(n-Bu)_3PHCl$ (90%, 2.15 g).

PREPARATION EXAMPLE 5

Preparation of $[(Cy)_3PH][B(C_6F_5)_4]$ $[Li][B(C_6F_5)_4]$ (1.0 g, 1.46 mmol) was suspended in $CH_2Cl_2$ (20 mL) in a 100 mL Schlenk flask and the $CH_2Cl_2$ (20 mL) solution of $(Cy)_3PHCl$ (0.56 g, 1.75 mmol) prepared in Example 3 was slowly added thereto. After stirring for 1 hour, the resulting slurry was filtered to yield a dark yellow filtrate and the solvent was removed in vacuum to obtain tricyclohexylphosphonium(tetrakispentafluorophenyl)borate $[(Cy)_3PH][B(C_6F_5)_4]$ (90%, 1.26 g).

$^1$H-NMR (600 MHz, $CD_2Cl_2$): δ5.32~4.65 (d, 1H, $J_{H-P}$=440 Hz), 2.43~1.33 (m, 33H); $^{13}$C-NMR (600 MHz, $CD_2Cl_2$): δ149.7, 148.1, 139.7, 139.2, 138.1, 138.0, 137.8, 136.2, 125.1, 124.9, 29.0, 28.8, 26.7 (d), 25.4 (s). $^{31}$P-NMR (600 MHz, $CD_2Cl_2$): 31.14 (d, $J_{P-H}$=440 Hz). $^{19}$F-NMR (600 MHz, $CD_2Cl_2$): −130.90, −161.51, −163.37.

Crystals suitable for an X-ray diffraction study were grown from a dichloromethane solution. The result of an X-ray crystal structure determination is presented in FIG. 1. Interestingly, the structure shows that the nonbonding interaction between the phosphorous atom of $[(Cy)_3PH]$ part and the fluorine atom of $[B(C_6F_5)_4]$ part exists.

PREPARATION EXAMPLE 6

Preparation of $[(Cy)_3PH][(B(C_6F_5)_4)$ $[(Cy)_3PH][(B(C_6F_5)_4)$ was prepared in the same manner as described in Preparation Example 5, except that $[Na][B(C_6F_5)_4]$ or $[MgBr][B(C_6F_5)_4]$ was used instead of $[Li][B(C_6F_5)_4]$. The synthesis yield was about 90%, similar to Example 5.

PREPARATION EXAMPLE 7

Preparation of $[(n-Bu)_3PH][(B(C_6F_5)_4)$ $[Li][B(C_6F_5)_4]$ (1.0 g, 1.46 mmol) was suspended in $CH_2Cl_2$ (20 mL) in a 100 mL Schlenk flask and the $CH_2Cl_2$ (20 mL) solution of $(n-Bu)_3PHCl$ (0.42 g, 1.75 mmol) prepared in Example 4 was slowly added thereto. After stirring for 1 hour, the resulting slurry was filtered to yield a dark yellow filtrate and the solvent was removed in vacuum to obtain tri n-butylphosphonium(tetrakispentafluorophenyl)borate [(n-Bu)$_3$PH][B(C$_6$F$_5$)$_4$] (87%, 1.12 g).

PREPARATION EXAMPLE 8

Preparation of [(t-Bu)$_3$PH][(B(C$_6$F$_5$)$_4$)

(t-Bu)$_3$P (0.35 g, 1.73 mmol, t-Bu=t-butyl) was dispersed in Et$_2$O (30 mL) in a 250 mL Schlenk flask. Then, anhydrous HCl (1.9 mL, 1.0 M in ether) was added to the solution at room temperature to afford a white solid. After stirring for about 20 minutes, the solid was filtered through a glass filter and washed three times with Et$_2$O (30 mL). Thereafter, the residual solvent was removed at room temperature in vacuum to obtain (t-Bu)$_3$PHCl as a white solid.

(t-Bu)$_3$PHCl was dissolved in CH$_2$Cl$_2$ (10 mL). In a glove box, [Li][B(C$_6$F$_5$)$_4$] (1.07 g, 1.56 mmol) was placed in a 100 mL schlenk flask and dissolved in CH$_2$Cl$_2$ (20 mL). Then, the (t-Bu)$_3$PHCl solution was added dropwise to the [Li][B(C$_6$F$_5$)$_4$] solution. After stirring for 1 hour, the resulting slurry was filtered to yield a green filtrate and the solvent was removed in vacuum to obtain tri t-butyl phosphonium(tetrakispentafluorophenyl)borate [(t-Bu)$_3$PH] [B(C$_6$F$_5$)$_4$] (67%, 1.05 g).

$^1$H-NMR (600 MHz, CD$_2$Cl$_2$): δ5.34~4.63 (d, 1H, $J_{H-P}$=440 Hz), 1.61 (d, 27H); $^{13}$C-NMR (600 MHz, CD$_2$Cl$_2$): δ149.5, 147.9, 139.6, 138.0, 137.7, 136.0,124.4, 38.3, 30.4. $^{31}$P-NMR (600 MHz, CD$_2$Cl$_2$): δ3.0 (d, $J_{P-H}$=440 Hz). $^{19}$F-NMR (600 MHz, CD$_2$Cl$_2$): −133.3, −163.9, −167.8.

PREPARATION EXAMPLE 9

Preparation of [(Et)$_3$PH][(B(C$_6$F$_5$)$_4$)

(Et)$_3$P (0.8 g, 6.77 mmol; Et=ethyl) was dispersed in Et$_2$O (50 mL) in a 250 mL Schlenk flask. Then, anhydrous HCl (7.4 mL, 1.0 M in ether) was added to the solution at room temperature to afford a white solid. After stirring for about 20 minutes, the solid was filtered through a glass filter and the resultant was washed with hexane (30 mL). Thereafter, the residual solvent was removed at room temperature in vacuum to obtain (Et)$_3$PHCl as a white solid.

(Et)$_3$PHCl was dissolved in CH$_2$Cl$_2$ (10 mL). In a glove box, [Li][B(C$_6$F$_5$)$_4$] (4.41 g, 6.43 mmol) was placed in a 100 mL Schlenk flask and dissolved in CH$_2$Cl$_2$ (50 mL). Then, the (Et)$_3$PHCl solution was added dropwise to the [Li][B(C$_6$F$_5$)$_4$] solution. After stirring for 1 hour, the resulting slurry was filtered to yield a green filtrate and the solvent was removed in vacuum to obtain triethylphosphonium(tetrakispentafluorophenyl)borate [(Et)$_3$PH][B(C$_6$F$_5$)$_4$] (54%, 2.91 g).

$^1$H-NMR (600 MHz, CD$_2$Cl$_2$): δ6.06 (m, 0.5H), 5.30 (m, 0.5H), 2.28 (m, 6H), 1.40 (m, 9H); $^{13}$C-NMR (600 MHz, CD$_2$Cl$_2$): δ149.5, 147.9, 139.7, 138.0, 137.9, 137.7, 136.1, 124.6, 10.6 (d), 6.8 (d). $^{31}$P-NMR (600 MHz, CD$_2$Cl$_2$): 26.3 (d). $^{19}$F-NMR (600 MHz, CD$_2$Cl$_2$): −133.5, −163.7, −167.8.

Preparation of Cyclic Olefin Addition-Polymers

EXAMPLE 1

Polymerization of 5-norbornene-2-allylacetate 5-norbornene-2-allylacetate (NB-CH$_2$—O—C(O)—CH$_3$) (5 mL, 30.9 mmol, NB=norbornene) and toluene (18 mL) were charged into a 250 mL Schlenk flask. Palladium acetate (Pd(OAc)$_2$)(OAc=acetate, 0.46 mg, 2.06 μmol) and [(Cy)$_3$PH][(B(C$_6$F$_5$)$_4$) (5.0 mg, 5.2 μmol) were dissolved in CH$_2$Cl$_2$ (1 mL) and added to the monomer solution. While the reaction mixture was stirred for 18 hours at 90° C., the reaction mixture became viscous. After the reaction was completed, 100 ml of toluene was added to the viscous solution to dilute it. The solution was poured into an excess of ethanol to precipitate a white polymer, which was filtered through a glass funnel, washed with ethanol, and dried in vacuo at 80° C. for 24 hours to yield 5-norbornene-2-allylacetate polymer (4.73 g: 92.2% by weight based on the total weight of used monomers). The weight average molecular weight (Mw) of the polymer was 250,071 and Mw/Mn was 2.70.

EXAMPLE 2

Polymerization of 5-norbornene-2-allylacetate

A polymer of 5-norbornene-2-allylacetate was obtained in the same manner as described in Example 1, except that Pd(OAc)$_2$ (0.14 mg, 0.62 μmol) and [(Cy)$_3$PH][(B(C$_6$F$_5$)$_4$) (1.2 mg, 1.24 μmol) were used and the polymerization temperature was 100° C. The resulting polymer was obtained in 4.00 g of yield (78% by weight based on the total weight of used monomers). The weight average molecular weight (Mw) of the polymer was 262,149 and Mw/Mn was 2.09.

EXAMPLE 3

Copolymerization of 5-norbornene-2-allylacetate and 5-butylnorbornene 5-norbornene-2-allylacetate (NB-CH$_2$—O—C(O)—CH$_3$) (5 mL, 30.9 mmol), 5-butyinorbornene (1.3 mL, 7.7 mmol), and toluene (7.3 mL) were charged into a 250 mL Schlenk flask. Pd(OAc)$_2$ (0.17 mg, 0.77 μmol) and [(Cy)$_3$PH][(B(C$_6$F$_5$)$_4$) (1.48 mg, 1.55 μmol) were dissolved in CH$_2$Cl$_2$ (1 mL) and added to the monomer solution. While the reaction mixture was stirred for 18 hours at 90° C., the reaction mixture became viscous. After the reaction was completed, 120 ml of toluene was added to the viscous solution to dilute it. The solution was poured into an excess of ethanol to precipitate a white polymer, which was filtered through a glass funnel, washed with ethanol, and dried in vacuo at 80° C. for 24 hours to yield 5-norbornene-2-allylacetate/5-butylnorbornene copolymer (4.35 g: 69.2% by weight based on the total weight of used monomers). The weight average molecular weight (Mw) of the copolymer was 303,550 and Mw/Mn was 2.16.

EXAMPLE 4

Copolymerization of 5-norbornene-2-allylacetate and 5-butylnorbornene 5-norbornene-2-allylacetate and 5-butylnorbornene were copolymerized in the same manner as described in Example 3, except that Pd(OAc)$_2$ (0.09 mg, 0.39 μmol) and [(Cy)$_3$PH][B(C$_6$F$_5$)$_4$] (0.74 mg, 0.77 μmol) were used. The resulting polymer was obtained in 2.9 g of yield (46% by weight based on the total weight of used monomers). The weight average molecular weight (Mw) of the polymer was 362,680 and Mw/Mn was 1.96.

EXAMPLE 5

Copolymerization of 5-norbornene-2-allylacetate, 5-butylnorbornene and 5-norbornene-2-carboxylic methylester 5-norbornene-2-allylacetate (5 mL, 30.9 mmol), 5-butyinorbornene (1.2 mL, 6.6 mmol), 5-norbornene-2-carboxylic methylester (1 mL, 6.6 mmol) and toluene (12.4 mL) were charged into a 250 mL Schlenk flask. Pd(OAc)$_2$ (0.66 mg, 2.94 µmol) and [(Cy)$_3$PH][(B(C$_6$F$_5$)$_4$) (5.65 mg, 5.88 µmol) were dissolved in CH$_2$Cl$_2$ (1 mL) and added to the monomer solution. While the reaction mixture was stirred for 18 hours at 90° C., the reaction mixture became viscous. After the reaction was completed, 120 ml of toluene was added to the viscous solution to dilute it. The solution was poured into an excess of ethanol to precipitate a white polymer, which was filtered through a glass funnel, washed with ethanol, and dried in vacuo at 80° C. for 24 hours to yield 5-norbornene-2-allylacetate/5-butylnorbornene/5-norbornene-2-carboxylic methylester polymer (6.45 g: 90.5% by weight based on the total weight of used monomers). The weight average molecular weight (Mw) of the polymer was 211,891 and Mw/Mn was 2.67.

EXAMPLE 6

Copolymerization of 5-norbornene-2-allylacetate, 5-butylnorbornene and 5-norbornene-2-carboxylic methylester 5-norbornene-2-allylacetate, 5-butylnorbornene and 5-norbornene-2-carboxylic methylester were copolymerized in the same manner as in Example 5, except that Pd(OAc)$_2$ (0.20 mg, 0.88 µmol) and [(Cy)$_3$PH][B(C$_6$F$_5$)$_4$] (1.70 mg, 1.77 µmol) were used. The resulting polymer was obtained in 3.3 g of yield (46.7% by weight based on the total weight of used monomers). The weight average molecular weight (Mw) of the polymer was 261,137 and Mw/Mn was 2.01.

EXAMPLES 7-13

Polymerization of 5-norbornene-2-allylacetate

Polymers of 5-norbornene-2-allylacetate were prepared in the same manner as described in Example 1, except that the molar ratio of [(Cy)$_3$PH][B(C$_6$F$_5$)$_4$] to Pd(OAc)$_2$ was changed to 2:1, 1:1, 2:3, 1:2, 1:4 and 1:8. 5-norbornene-2-allylacetate (4 mL, 24.7 mmol) and toluene (12 mL) were used and polymerization temperature and time were 90° C. and 4 hours, respectively. The experimental procedure was carried out in the same manner as described in Example 1 and the results are shown in Table 1 below.

TABLE 1

| | Pd(OAc)$_2$ (mg) | [HP(Cy)$_3$] [B(C$_6$F$_5$)$_4$] (mg) | Pd/B (molar ratio) | Yield [g] | Yield [%] | Mw | Mw/Mn |
|---|---|---|---|---|---|---|---|
| Example 7 | 1.1 | 2.4 | 2/1 | 1.77 | 43.2 | 333,400 | 2.11 |
| Example 8 | 1.1 | 4.7 | 1/1 | 3.52 | 86.0 | 272,800 | 2.28 |
| Example 9 | 1.1 | 7.1 | 2/3 | 3.82 | 93.2 | 260,000 | 2.56 |
| Example 10 | 1.1 | 9.5 | 1/2 | 3.83 | 93.4 | 256,300 | 2.49 |
| Example 11 | 1.1 | 19.0 | 1/4 | 3.80 | 90.5 | 221,600 | 2.45 |
| Example 12 | 1.1 | 28.4 | 1/6 | 3.39 | 82.7 | 194,100 | 2.25 |
| Example 13 | 1.1 | 38.0 | 1/8 | 3.30 | 80.5 | 193,200 | 2.20 |

EXAMPLES 14-16

Polymerization of 5-norbornene-2-allylacetate 5-norbornene-2-allylacetate was polymerized together with cyclopentene in molar ratios of cyclopentene to 5-norbornene-2-allylacetate of 10:1, 5:1 and 7:3. 5-norbornene-2-allylacetate (10 mL, 61.7 mmol) and toluene (20 mL) were charged into a 250 mL Schienk flask. Pd(OAc)$_2$ was used in a molar ratio of 1:5000 based on total amount of cyclopentene and the monomer and the molar ratio of [(Cy)$_3$PH][B(C$_6$F$_5$)$_4$] to Pd(OAc)$_2$ was 2:1. The experimental procedure was carried out in the same manner as described in Example 1 and the result was shown in Table 2.

TABLE 2

| | Monomer/Cp (molar ratio) | Cp(mL) | Pd(OAc)$_2$ (mg) | Yield | Mw | Mn | Mw/Mn |
|---|---|---|---|---|---|---|---|
| Example 14 | 10/1 | 0.54 | 3.1 | 9.7 g (91%) | 136,701 | 56,387 | 2.42 |
| Example 15 | 5/1 | 1.4 | 3.5 | 9.4 g (83.2%) | 76,135 | 28,945 | 2.63 |
| Example 16 | 7/3 | 2.3 | 4.0 | 9.2 g (76%) | 62,607 | 25,584 | 2.45 |

EXAMPLE 17

Polymerization of 5-norbornene-2-allylacetate 5-norbornene-2-allylacetate (10 mL, 61.7 mmol) and wet toluene (35 mL) were charged into a 250 mL Schlenk flask in air. Pd(OAc)$_2$ (0.92 mg, 4.11 µmol) and [(Cy)$_3$PH][B(C$_6$F$_5$)$_4$] (7.9 mg, 8.23 µmol) were dissolved in CH$_2$Cl$_2$ (1 mL) and added to the monomer solution. While the reaction mixture was stirred for 18 hours at 90° C., the reaction mixture became viscous. After the reaction was completed, 120 ml of toluene was added to the viscous solution to dilute it. The solution was poured into an excess of ethanol to precipitate a white polymer, which was filtered through a glass funnel, washed with ethanol, and dried in vacuo at 80° C. for 24 hours to yield a 5-norbornene-2-allylacetate polymer (9.74 g: 95% by weight based on the total weight of used monomers). The weight average molecular weight (Mw) of the polymer was 271,010 and Mw/Mn was 2.40.

EXAMPLES 18-20

Polymerization of 5-norbornene-2-allylacetate 5-norbornene-2-allylacetate was polymerized in the same manner as described in Example 17, except that the relative amounts of a toluene and a catalyst over a monomer were varied. The results were shown in Table 3.

TABLE 3

|  | Monomer (mL) | Toluene/ Monomer (volumetric ratio) | Monomer/ catalyst (molar ratio) | Yield | Mw | Mn | Mw/Mn |
| --- | --- | --- | --- | --- | --- | --- | --- |
| Example 17 | 10 | 3.0 | 15,000 | 9.74 g (95.0%) | 271,000 | 113,000 | 2.40 |
| Example 18 | 10 | 2.0 | 15,000 | 9.70 g (94.6%) | 319,000 | 124,000 | 2.57 |
| Example 19 | 10 | 3.0 | 10,000 | 10.08 g (98.4%) | 287,000 | 114,000 | 2.51 |
| Example 20 | 10 | 2.0 | 10,000 | 10.04 g (98.0%) | 307,000 | 120,000 | 2.57 |

EXAMPLES 21-23

Polymerization of 5-norbornene-2-allylacetate 5-norbornene-2-allylacetate (3 mL, 18.5 mmol) and toluene (11 mL) were charged into a 250 mL Schlenk flask and a 1.23 mM catalyst solution in $CH_2Cl_2$ was prepared in a 2:1 ratio of $[(Cy)_3PH][B(C_6F_5)_4]$ to $Pd(OAc)_2$. The catalyst solution was used in polymerization after aging for 24, 32, and 48 hours. The reaction temperature was 90° C. and the reaction time was 18 hours. The subsequent experimental procedure was carried out in the same manner as described in Example 1 and the result was shown in Table 4.

TABLE 4

|  | Aging time (hr) | Yield (%) | Mw | Mn | Mw/Mn |
| --- | --- | --- | --- | --- | --- |
| Example 21 | 24 | 93.2 | 288,395 | 126,503 | 2.28 |
| Example 22 | 32 | 86.0 | 304,280 | 144,515 | 2.11 |
| Example 23 | 48 | 94.3 | 284,763 | 131,954 | 2.16 |

The catalyst solution containing $[(Cy)_3PH][(B(C_6F_5)_4)$ was observed to kept yellow color even after aging for 48 hours. As shown in Table 4, the polymerization yield was 90% or greater and the molecular weight was 250,000-290,000. The catalyst including $[(Cy)_3PH][(B(C_6F_5)_4)$ maintained good catalytic activity and good stability even after aging.

EXAMPLES 24-25

Polymerization of 5-norbornene-2-allylacetate 5-norbornene-2-allylacetate (5 mL, 30.9 mmol) and toluene (18 mL) were charged into a 250 mL Schlenk flask. $Pd(OAc)_2$ (0.46 mg, 2.06 μmol) and $[(Cy)_3PH][B(C_6F_5)_4]$ (5.0 mg, 5.2 μmol) were dissolved in $CH_2Cl_2$ (1 mL) and added to the monomer solution. Polymerization was carried out at 80° C. and 150° C. for 18 hours. The subsequent experimental procedure was carried out in the same manner as in Example 1 to obtain a 5-norbornene-2-allylacetate polymer and the results were shown in Table 5. For reference, the results of Example 1 were also added to Table 5.

TABLE 5

|  | Polymerization temperature (° C.) | Yield (%) | Mw | Mn | Mw/Mn |
| --- | --- | --- | --- | --- | --- |
| Example 1 | 90 | 92.2 | 250,071 | 92,619 | 2.70 |
| Example 24 | 80 | 83.0 | 312,300 | 138,200 | 2.26 |
| Example 25 | 150 | 85.0 | 145,000 | 62,000 | 2.34 |

EXAMPLE 26

Polymerization 5-acetylnorbornene 5-acetylnorbornene (NB—O—C(O)—$CH_3$) (10 mL, 68.6 mmol, NB=norbornene) was charged into a 250 mL Schlenk flask. $Pd(OAc)_2$ (1.5 mg, 6.86 μmol) and $[(Cy)_3PH][B(C_6F_5)_4]$ (13.2 mg, 13.72 μmol) were dissolved in $CH_2Cl_2$ (1 mL) and added to the monomer solution. After 5 minutes, 5 mL of toluene was slowly added. While the reaction mixture was stirred for 18 hours at 90° C. the reaction mixture became viscous. 5 mL of toluene was added four times at intervals of 30 minutes to add a total of 20 mL of toluene. After the reaction was completed, 200 ml of toluene was added to the viscous solution to dilute it. The solution was poured into an excess of ethanol to precipitate a white polymer, which was filtered through a glass funnel, washed with ethanol, and dried in vacuo at 80° C. for 24 hours to yield a 5-acetylnorbornene polymer (5.44 g: 52.1% by weight based on the total weight of used monomers). The weight average molecular weight (Mw) of the polymer was 218,400 and Mw/Mn was 2.29.

EXAMPLE 27

Polymerization 5-acetylnorbornene 5-acetyinorbornene (NB—O—C(O)—CH$_3$) (10 mL, 68.6 mmol, NB=norbornene) was charged into a 250 mL Schlenk flask. Pd(OAc)$_2$ (2.2 mg, 9.8 μmol) and [(Cy)$_3$PH][B(C$_6$F$_5$)$_4$] (18.8 mg, 19.6 μmol) were dissolved in CH$_2$Cl$_2$ (1 mL) and added to the monomer solution. After 2 minutes, 5 mL of toluene was slowly added. While the reaction mixture was stirred for 18 hours at 90° C., the reaction mixture became viscous. 5 mL of toluene was added after 10, 30, 120 and 240 minutes to add a total of 20 mL of toluene. After the reaction was completed, 200 ml of toluene was added to the viscous solution to dilute it. The solution was poured into an excess of ethanol to precipitate a white polymer, which was filtered through a glass funnel, washed with ethanol, and dried in vacuo at 80° C. for 24 hours to yield a 5-acetylnorbornene polymer (6.42 g: 61.5% by weight based on the total weight of used monomers). The weight average molecular weight (Mw) of the polymer was 198,953 and Mw/Mn was 2.33.

COMPARATIVE EXAMPLES 1-3

Polymerization of 5-norbornene-2-allylacetate

A catalyst system including Pd(OAc)$_2$, dimethylanilium (tetrakispentafluorophenyl)borate ([PhNMe$_2$H][B(C$_6$F$_5$)$_4$]) and P(Cy)$_3$ was used. The molar ratio of [PhNMe$_2$H][B(C$_6$F$_5$)$_4$] to Pd(OAc)$_2$ was 2:1 and the molar ratio of P(Cy)$_3$ to Pd(OAc)$_2$ was 1:1. These catalyst components were dissolved in CH$_2$Cl$_2$ to prepare a 1.23 mM orange catalyst solution. Polymerization was carried out in the same manner as described in Examples 21-23. The results were shown in Table 6.

TABLE 6

|  | Aging time (hr) | Yield (%) | Mw | Mn | Mw/Mn |
|---|---|---|---|---|---|
| Comparative Example 1 | 24 | 81.7 | 289,461 | 135,137 | 2.14 |
| Comparative Example 2 | 32 | 32.7 | 300,643 | 145,393 | 2.07 |
| Comparative Example 3 | 48 | 2.60 | 233,495 | 116,726 | 2.00 |

The catalyst solution including [PhNMe$_2$H][B(C$_6$F$_5$)$_4$] turned from orange to green in color after 10 minutes. When polymerization was carried out using the green catalyst solution, the polymerization yield was 80% after aging for 24 hours and was reduced to 10% or less after aging for 48 hours. As a result, the catalyst solutions of Comparative Examples 1-3 including [PhNMe$_2$H][B(C$_6$F$_5$)$_4$] were less stable than the catalyst solutions of Examples 21-23 including [(Cy)$_3$PH][(B(C$_6$F$_5$)$_4$).

COMPARATIVE EXAMPLE 4

Polymerization of 5-norbornene-2-allylacetate

[Li][B(C$_6$F$_5$)$_4$] (20.6 mg, 0.0030 mmol) and 5-norbornene-2-allylacetate (5.0 g, 30 mmol) were charged into a 250 mL Schlenk flask. A solution of [(Allyl)PdCl]$_2$ (0.55 mg, 0.0015 mmol) and P(Cy)$_3$ (0.84 mg, 0.0030 mmol) in toluene (0.1 mL) was added to the flask. Polymerization was carried out at 90° C. for 18 hours and the resulting solution was added into an excess amount of ethanol to precipitate polymeric materials. However, no polymer was obtained.

COMPARATIVE EXAMPLE 5

Polymerization of 5-norbornene-2-carboxylic methylester 5-norbornene-2-carboxylic methylester (MENB(NB-C(O)—O—CH$_3$) (5 mL, 34.4 mmol) and toluene (18 mL) were charged into a 250 mL Schlenk flask. A CH$_2$Cl$_2$ solution (1 mL) of Pd(OAc)$_2$ (0.772 mg, 3.44 μmol) and [HP(Cy)$_3$][B(C$_6$F$_5$)$_4$] (6.61 mg, 6.88 μmol) was added to the monomer solution with a syringe at 90° C. A polymerization reaction was carried out at 90° C. for 18 hours. Thereafter, the resulting solution was added to an excess amount of ethanol to obtain white polymer precipitates. The precipitates were filtered through a glass filter to recover a polymer. The polymer was dried in a vacuum oven at 80° C. for 24 hours to obtain 5-norbornene-2-carboxylic methylester polymer (0.8 g: 15% by weight based on the total weight of used monomers).

COMPARATIVE EXAMPLE 6

Polymerization of 5-norbornene-2-carboxylic butylester 5-norbornene-2-carboxylic butylester (MENB(NB—C(O)—O—CH$_2$CH$_2$CH$_2$CH$_3$) (5 mL, 34.4 mmol) and toluene (17 mL) were charged into a 250 mL Schienk flask. A CH$_2$Cl$_2$ solution (1 mL) of Pd(OAc)$_2$ (0.56 mg, 2.51 μmol) and [HP(Cy)$_3$][B(C$_6$F$_5$)$_4$] (4.82 mg, 5.02 μmol) was added to the monomer solution with a syringe at 90° C. A polymerization reaction was carried out at 90° C. for 18 hours. Thereafter, the resulting solution was added to an excess amount of ethanol. However, no polymer was obtained.

COMPARATIVE EXAMPLE 7

Polymerization of 5-norbornene-2-allylacetate 5-norbornene-2-allylacetate (5 mL, 30.9 mmol) and toluene (18 mL) were charged into a 100 mL Schlenk flask. Pd(OAc)$_2$ (0.69 mg, 3.09 μmol) and [HP(Cy)$_3$][B(C$_6$F$_5$)$_4$] (5.94 mg, 6.18 μmol) were dissolved in CH$_2$Cl$_2$ (1 mL) and then AlEt$_3$ (18.5 μl, 18.5 μmol) was added thereto. The solution immediately turned black in color. The black catalyst solution was added to the monomer solution. Polymerization was carried out at 90° C. for 18 hours. Thereafter, the resulting solution was added to ethanol. However, no polymer was obtained.

COMPARATIVE EXAMPLE 8

Polymerization of 5-norbornene-2-allylacetate 5-norbornene-2-allylacetate (5 mL, 30.9 mmol) and toluene (18 mL) were charged into a 100 mL Schlenk flask. Pd(OAc)$_2$ (0.69 mg, 3.09 μmol) and [PhNMe$_2$H][B(C$_6$F$_5$)$_4$] (5.94 mg, 6.18 μmol) as catalysts were dissolved in CH$_2$Cl$_2$ (1 mL), and then a colorless (Cy)$_3$P.AlEt$_3$ complex solution including Cy$_3$P (0.87 mg, 3.09 μmol) and AlEt$_3$ (3.09 μl, 3.09 μmol) was added thereto. The solution immediately turned black in color. The black catalyst solution was added to the monomer solution. Polymerization was carried out at 90° C.

for 18 hours. Thereafter, the resulting solution was added to an excess amount of ethanol to obtain white polymer precipitates. The precipitate was filtered through a glass filter and dried in a vacuum oven at 80° C. for 24 hours to obtain a polymer (0.5 g: 10% by weight based on the total weight of used monomers).

COMPARATIVE EXAMPLES 9 AND 10

Polymerization of 5-norbornene-2-allylacetate 5-norbornene-2-allylacetate (5 mL, 30.9 mmol) and toluene (18 mL) were charged into a 250 mL Schlenk flask. Pd(OAc)$_2$ (0.46 mg, 2.06 μmol) and [(Cy)$_3$PH][B(C$_6$F$_5$)$_4$] (5.0 mg, 5.2 μmol) were dissolved in CH$_2$Cl$_2$ (1 mL) and added to the monomer solution. Polymerization was carried out at 50° C. and 170° C. for 18 hours. The subsequent experimental procedure was carried out in the same manner as described in Example 1. The results were shown in Table 7.

TABLE 7

|  | Polymerization temperature (° C.) | Yield (%) | Mw | Mn | Mw/Mn |
|---|---|---|---|---|---|
| Comparative Example 9 | 50 | 18.0 | 265,000 | 120,400 | 2.20 |
| Comparative Example 10 | 170 | 34.0 | 105,000 | 42,800 | 2.45 |

As can be seen in Table 7, as polymerization temperatures such as 50 and 170° C. are not within the range defined above, polymerization yields are considerably reduced. The reason for this is as described above.

COMPARATIVE EXAMPLE 11

Polymerization of 5-norbornene-2-carboxylic acid 5-norbornene-2-carboxylic acid (10 g) and [Pd(C$_6$H$_5$CN)Cl$_2$]$_2$ (100 mg) were reacted at 140° C. for 10.5 hours to obtain a polymer (5.75 g). The obtained polymer had a molecular weight of 1129.

COMPARATIVE EXAMPLE 12

Polymerization of 5-norbornene-2-methyl-decanylacetate 5-norbornene-2-methyl-decanylacetate (1.03 g, 3.7 mmol) was charged into a 250 mL Schlenk flask. [(Allyl)PdCl]$_2$ (13.15 mg, 3.60×10$^{-2}$ mmol) and AgSbF$_6$ (35 mg, 10.1×10$^{-2}$ mmol) were dissolved in chlorobenzene (2 mL). AgCl precipitates were filtered and the resulting solution was added to the monomer solution to react for 24 hours. The polymerization yield was 1.01 g (98%) and the weight average molecular weight was 58,848.

COMPARATIVE EXAMPLE 13

Polymerization of 5-norbornene-2-allylacetate 5-norbornene-2-allylacetate (5.0 g, 30 mmol) and Li[B(C$_6$F$_5$)$_4$] were charged into a 250 mL Shlenk flask. A toluene solution (0.1 mL) of [(Allyl)PdCl]$_2$ (0.55 mg, 0.0015 mmol) P(Cy)$_3$ (0.84 mg, 0.0030 mmol) was added to the monomer solution. A polymerization reaction was carried out at 65° C. for 4 hours to obtain 0.25 g of a polymer (5%).

COMPARATIVE EXAMPLE 14

Polymerization of 5-norbornene-2-allylacetate 5-norbornene-2-allylacetate (5 mL, 30.9 mmol) and toluene (15 mL) were charged into a 250 mL Schlenk flask. A CH$_2$Cl$_2$ solution (1 mL) of Pd(OAc)$_2$ (1.4 mg, 6.2 mol) and [PhNMe$_2$H][B(C$_6$F$_5$)$_4$] (10.9 mg, 13.6 mol) was added to the monomer solution. A polymerization reaction was carried out at 90° C. for 18 hours. Thereafter, the resulting solution was added to an excess amount of ethanol. However, no polymer was obtained.

Preparation of Optical Anisotropic Film

EXAMPLES 28 AND 29

Each of the polymers prepared in Examples 1 and 3 was mixed with a solvent to form a coating solution as shown in Table 8. The coating solutions were cast on a glass substrate using a knife coater or a bar coater, and then the substrate was dried at room temperature for 1 hour and further dried under a nitrogen atmosphere at 100° C. for 18 hours. The glass substrate was kept at −10° C. for 10 seconds and the film on the glass plate was peeled off to obtain a clear film having a uniform thickness. The thickness deviation of the film was less than 2%. The thickness and the light transmittance of the obtained film were shown in Table 8.

TABLE 8

|  | Composition of film solution | | Physical properties of film | |
|---|---|---|---|---|
|  | Polymer (parts by weight) | Solvent (parts by weight) | Thickness (μm) | Light transmittance (%) |
| Example 28 | Polymer prepared in Example 1 | THF 560 | 114 | 92 |
| Example 29 | Polymer prepared in Example 3 | CH$_2$Cl$_2$ 360 and TOLUENE 200 | 120 | 92 |

In Table 8, THF is tetrahydrofurane.

Measurement of Optical Anisotropy

EXPERIMENTAL EXAMPLES 1 AND 2

For clear films produced in Examples 28 and 29, a refractive index n was measured using an Abbe refractometer, an in-plane retardation value Re was measured using an automatic birefringence analyzer (available from Oji Scientific Instrument; KOBRA-21 ADH), and a retardation value Ro was measured when the angle between incident light and the film surface was 50° and a retardation value R$_{th}$ between the direction through the film thickness and the in-plane x-axis was calculated using Equation (2):

$$R_{th} = \frac{R_\theta \times \cos\theta_f}{\sin^2\theta_f}. \qquad (2)$$

A refractive index difference (n$_x$-n$_y$) and a refractive index difference (n$_y$-n$_z$) were calculated by dividing R$_e$ and R$_{th}$ by the film thickness. (n$_x$-n$_y$), R$_\theta$, R$_{th}$ and (n$_y$-n$_z$) of each clear film were indicated in Table 9.

TABLE 9

| | n (refractive index) | $(n_x - n_y) \times 10^3$ | $R_{th}$ (nm/μm) | $(n_y - n_z) \times 10^3$ |
|---|---|---|---|---|
| Experimental Example 1 | 1.52 | 0.008 | 2.32 | — |
| Experimental Example 2 | 1.50 | 0.009 | 2.13 | 2.13 |

When films were covered with a triacetate cellulose film having $n_y > n_z$, $R_\theta$ values of all cyclic olefin films increased, which indicates that $R_{th}$ of a cyclic olefin film is produced due to a negative birefringence ($n_y > n_z$) in a direction through the film thickness.

The catalyst system for polymerization of olefin according to the present invention has good thermal and chemical stability, and thus, in the method of preparing polyolefin using the catalyst system, the deactivation of a catalyst due to a polar functional group of the monomer can be prevented, and thus a high yield of the cyclic olefin polymer with a high molecular weight can be obtained when a ratio of the catalyst to the monomer is 1:5000, and the removal of a catalyst residue is not required.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A catalyst system for producing cyclic olefin polymers having polar functional groups, the catalyst system comprising:
   i) a procatalyst represented by formula (1) containing a group 10 metal and a ligand containing hetero atoms bonded to the metal;
   ii) a cocatalyst represented by formula (2) including a salt compound which is capable of providing a phosphonium cation and an anion weakly coordinating to the metal of the procatalyst:

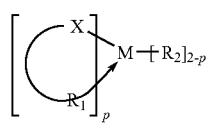
(1)

where X is a hetero atom selected from S, O and N;
$R_1$ is —CH=CHR$^{20}$, —OR$^{20}$, —SR$^{20}$, —N(R$^{20}$)$_2$, —N=NR$^{20}$, —P(R$^{20}$)$_2$, —C(O)R$^{20}$, —C(R$^{20}$)=NR$^{20}$, —C(O)OR$^{20}$, —OC(O)OR$^{20}$, —OC(O)R$^{20}$, —C(R$^{20}$)=CHC(O)R$^{20}$, —R$^{21}$C(O)R$^{20}$, —R$^{21}$C(O)OR$^{20}$ or —R$^{21}$OC(O)R$^{20}$, where R$^{20}$ is a hydrogen, a halogen, a linear or branched $C_{1-5}$ alkyl, a linear or branched $C_{1-5}$ haloalkyl, a linear or branched $C_{5-10}$ cycloalkyl, a linear or branched $C_{2-5}$ alkenyl, a linear or branched $C_{2-5}$ haloalkenyl, or an optionally substituted $C_{7-24}$ aralkyl, and R$^{21}$ is a $C_{1-20}$ hydrocarbylene;
$R_2$ is a linear or branched $C_{1-20}$ alkyl, alkenyl or vinyl; a $C_{5-12}$ cycloalkyl optionally substituted by a hydrocarbon; a $C_{6-40}$ aryl optionally substituted by a hydrocarbon; a $C_{7-15}$ aralkyl optionally substituted by a hydrocarbon; or $C_{3-20}$ alkynyl;
M is a group 10 metal; and
p is an integer from 0 to 2, and

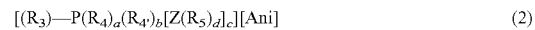
(2)

where each of a, b and c is an integer from 0 to 3, and a+b+c=3;
Z is O, S, Si or N;
d is 1 when Z is O or S, d is 2 when Z is N, and d is 3 when Z is Si;
$R_3$ is a hydrogen, an alkyl, or an aryl;
each of $R_4$, $R_{4'}$ and $R_5$ is a hydrogen; a linear or branched $C_{1-20}$ alkyl, alkoxy, allyl, alkenyl or vinyl; a $C_{3-12}$ cycloalkyl optionally substituted by a hydrocarbon; a $C_{6-40}$ aryl optionally substituted by a hydrocarbon; a $C_{7-15}$ aralkyl optionally substituted by a hydrocarbon; a $C_{3-20}$ alkynyl; a tri(linear or branched $C_{1-10}$ alkyl)silyl; a tri(linear or branched $C_{1-10}$ alkoxy)silyl; a tri(optionally substituted $C_{3-12}$ cycloalkyl)silyl; a tri(optionally substituted $C_{6-40}$ aryl)silyl; a tri(optionally substituted $C_{6-40}$ aryloxy)silyl; a tri(linear or branched $C_{1-10}$ alkyl)siloxy; a tri(optionally substituted $C_{3-12}$ cycloalkyl)siloxy; or a tri(optionally substituted $C_{6-40}$ aryl)siloxy, in which each substituent is a halogen or $C_{1-20}$ haloalkyl; and
[Ani] is an anion capable of weakly coordinating to the metal M of the procatalyst represented by formula (1) and is selected from the group consisting of borate, aluminate, [SbF$_6$]—, [PF$_6$]—, [AsF$_6$]—, perfluoroacetate([CF$_3$CO$_2$]—), perfluoropropionate ([C$_2$F$_5$CO$_2$]—), perfluorobutyrate ([CF$_3$CF$_2$CF$_2$CO$_2$]—), perchlorate([ClO$_4$]—), p-toluenesulfonate([p-CH$_3$C$_6$H$_4$SO$_3$]—), [SO$_3$CF$_3$]—, boratabenzene, and carborane optionally substituted with a halogen.

2. The catalyst system of claim 1, wherein the borate or aluminate of formula (2) is an anion represented by formula (2a) or (2b):

(2a),

(2b)

where M' is B or Al;
$R_6$ is a halogen, a linear or branched $C_{1-20}$ alkyl or alkenyl optionally substituted by a halogen, a $C_{3-12}$ cycloalkyl optionally substituted by a halogen, a $C_{6-40}$ aryl optionally substituted by a hydrocarbon, a $C_{6-40}$ aryl optionally substituted by a linear or branched $C_{3-20}$ trialkylsiloxy or a linear or branched $C_{18-48}$ triarylsiloxy, or a $C_{7-15}$ aralkyl optionally substituted by a halogen.

3. The catalyst system of claim 1, wherein the procatalyst represented by formula (1) and the cocatalyst represented by formula (2) are a group 10 metal containing compound represented by formula (3) and a phosphonium compound represented by formula (4), respectively;

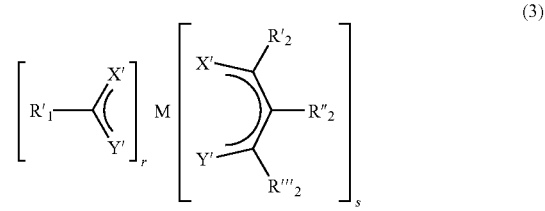
(3)

where each of X' and Y' is a hetero atom selected from S and O;
each of $R_1'$, $R_2'$, $R_2''$ and $R_2'''$ is a linear or branched $C_{1-20}$ alkyl, alkenyl or vinyl; a $C_{5-12}$ cycloalkyl optionally substituted by a hydrocarbon; a $C_{6-40}$ aryl optionally substituted by a hydrocarbon; a $C_{7-15}$ aralkyl optionally substituted by a hydrocarbon; or a $C_{3-20}$ alkynyl;

M is a group 10 metal; and each of r and s is an integer from 0 to 2 and r+s=2, and $$[H\text{—}P(R_4)_3][Ani] \quad (4)$$

where $R_4$ is a hydrogen; a linear or branched $C_{1-20}$ alkyl, alkoxy, allyl, alkenyl or vinyl; an optionally substituted $C_{3-12}$ cycloalkyl; an optionally substituted $C_{6-40}$ aryl; an optionally substituted $C_{7-15}$ aralkyl; or a $C_{3-20}$ alkynyl, in which each substituent is a halogen or a $C_{1-20}$ haloalkyl; and

[Ani] is an anion capable of weakly coordinating to the metal M of the procatalyst represented by formula (1) and is selected from the group consisting of borate, aluminate, $[SbF_6]\text{—}$, $[PF_6]\text{—}$, $[AsF_6]\text{—}$, perfluoroacetate($[CF_3CO_2]\text{—}$), perfluoropropionate ($[C_2F_5CO_2]\text{—}$), perfluorobutyrate ($[CF_3CF_2CF_2CO_2]\text{—}$), perchlorate($[ClO_4]\text{—}$), p-toluenesulfonate($[p\text{-}CH_3C_6H_4SO_3]\text{—}$), $[SO_3CF_3]\text{—}$, boratabenzene, and carborane optionally substituted by a halogen.

4. The catalyst system of claim 1, wherein the procatalyst represented by formula (1) and the cocatalyst represented by formula (2) are a palladium compound represented by formula (3a) and a phosphonium compound represented by formula (4), respectively;

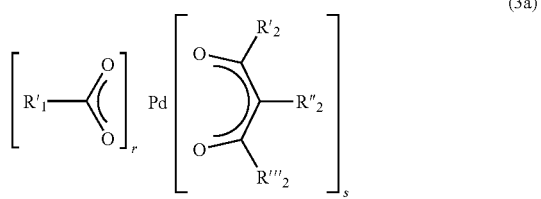

(3a)

where each of $R_1'$, $R_2'$, $R_2''$ and $R_2'''$ is a linear or branched $C_{1-20}$ alkyl, alkenyl or vinyl; a $C_{5-12}$ cycloalkyl optionally substituted by a hydrocarbon; a $C_{6-40}$ aryl optionally substituted by a hydrocarbon; a $C_{7-15}$ aralkyl optionally substituted by a hydrocarbon; or a $C_3$ alkynyl; and each of r and s is an integer from 0 to 2 and r+s=2, and $$[H\text{—}P(R_4)_3][Ani] \quad (4)$$

where $R_4$ is a hydrogen; a linear or branched $C_{1-20}$ alkyl, alkoxy, allyl, alkenyl or vinyl; an optionally substituted $C_{3-12}$ cycloalkyl; an optionally substituted $C_{6-40}$ aryl; an optionally substituted $C_{7-15}$ aralkyl; or a $C_{3-20}$ alkynyl, in which each substituent is a halogen or a $C_{1-20}$ haloalkyl; and

[Ani] is an anion capable of weakly coordinating to the metal M of the procatalyst represented by formula (1) and is selected from the group consisting of borate, aluminate, $[SbF_6]\text{—}$, $[PF_6]\text{—}$, $[AsF_6]\text{—}$, perfluoroacetate($[CF_3CO_2]\text{—}$), perfluoropropionate ($[C_2F_5CO_2]\text{—}$), perfluorobutyrate ($[CF_3CF_2CF_2CO_2]\text{—}$), perchlorate($[ClO_4]\text{—}$), p-toluenesulfonate($[p\text{-}CH_3C_6H_4SO_3]\text{—}$), $[SO_3CF_3]\text{—}$, boratabenzene, and carborane optionally substituted by a halogen.

5. The catalyst system of claim 1, wherein, in the procatalyst represented by formula (1), the metal is Pd, p is 2, and the ligand having a hetero atom directly coordinating to the metal is acetylacetonate or acetate, and in the cocatalyst including a salt compound having phosphonium represented by formula (2), b is 0, c is 0, $R_3$ is H, and $R_4$ is cyclohexyl, isopropyl, t-butyl, n-butyl or ethyl.

6. The catalyst system of claim 1, wherein the molar ratio of the cocatalyst to the procatalyst is in the range of 0.5:1 to 10:1.

7. The catalyst system of claim 1, wherein a catalyst mixture comprising the procatalyst and the cocatalyst is supported on an inorganic support.

8. The catalyst system of claim 7, wherein the inorganic support is at least one selected from the group consisting of silica, titania, silica/chromia, silica/chromia/titania, silica/alumina, aluminum phosphate gel, silanized silica, silica hydrogel, montmorillonite clay and zeolite.

9. The catalyst system of claim 1, wherein the catalyst mixture is dissolved in at least one organic solvent selected from the group consisting of dichloromethane, dichloroethane, toluene, chlorobenzene and a mixture thereof.

10. The catalyst system of claim 1, wherein the catalyst mixture comprises a metal catalyst complex composed of the procatalyst and the cocatalyst.

* * * * *